US010571698B2

United States Patent
Matsuki et al.

(10) Patent No.: US 10,571,698 B2
(45) Date of Patent: Feb. 25, 2020

(54) LIGHT GUIDE DEVICE AND DISPLAY APPARATUS

(71) Applicant: SEIKO EPSON CORPORATION, Tokyo (JP)

(72) Inventors: Hayato Matsuki, Suwa (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 193 days.

(21) Appl. No.: 15/923,485

(22) Filed: Mar. 16, 2018

(65) Prior Publication Data
US 2018/0284445 A1    Oct. 4, 2018

(30) Foreign Application Priority Data

Mar. 28, 2017   (JP) .................................. 2017-062400

(51) Int. Cl.
*G02B 27/01*    (2006.01)
*F21V 8/00*    (2006.01)

(52) U.S. Cl.
CPC ......... *G02B 27/0172* (2013.01); *G02B 6/003* (2013.01); *G02B 6/002* (2013.01); *G02B 2027/0118* (2013.01); *G02B 2027/0125* (2013.01); *G02B 2027/0145* (2013.01); *G02B 2027/0178* (2013.01)

(58) Field of Classification Search
CPC ................ G02B 27/0172; G02B 6/003; G02B 2027/0125
See application file for complete search history.

(56) References Cited

U.S. PATENT DOCUMENTS

| 9,248,616 | B2 |  | 2/2016 | Amitai |  |
|---|---|---|---|---|---|
| 10,108,015 | B2 | * | 10/2018 | Komatsu | ............... G02B 17/086 |
| 10,386,642 | B2 | * | 8/2019 | Piskunov | ............ G02B 27/0172 |
| 2003/0165017 | A1 |  | 9/2003 | Amitai |  |
| 2004/0085649 | A1 |  | 5/2004 | Repetto et al. |  |
| 2007/0091445 | A1 |  | 4/2007 | Amitai |  |
| 2007/0097513 | A1 |  | 5/2007 | Amitai |  |
| 2008/0285140 | A1 |  | 11/2008 | Amitai |  |
| 2013/0182317 | A1 | * | 7/2013 | Takahashi | ................. G02B 5/04 359/365 |
| 2016/0282622 | A1 |  | 9/2016 | Hiraide |  |

(Continued)

FOREIGN PATENT DOCUMENTS

JP    2004-157520 A    6/2004
JP    2007-505353 A    3/2007

(Continued)

*Primary Examiner* — Evan P Dzierzynski
(74) *Attorney, Agent, or Firm* — Oliff PLC

(57) ABSTRACT

A light guide device used in a display apparatus includes a transparent light guide portion that guides light beams incident from one end side to a light-emitting portion. The light guide portion includes a plurality of partial reflection surfaces between a first surface and a second surface which are parallel to each other, the plurality of partial reflection surfaces being inclined at the same angle from a normal direction with respect to the second surface toward the one end side. In the plurality of partial reflection surfaces, an appropriate incident angle range of the partial reflection surface positioned on the one end side is set to a larger angle than that of the partial reflection surface positioned on another end side.

11 Claims, 22 Drawing Sheets

(56) References Cited

U.S. PATENT DOCUMENTS

2017/0219830 A1    8/2017   Komatsu et al.
2018/0101011 A1*   4/2018   Shih .................... G02B 6/0046

FOREIGN PATENT DOCUMENTS

| | | |
|---|---|---|
| JP | 5698297 B2 | 4/2015 |
| JP | 2016-177231 A | 10/2016 |
| JP | 2017-003845 A | 1/2017 |
| WO | 01/95027 A2 | 12/2001 |
| WO | 2005/024969 A2 | 3/2005 |

\* cited by examiner

FIG. 3

| SURFACE NUMBER | | | (3) | (4) | (5) | (6) | (7) | (8) |
|---|---|---|---|---|---|---|---|---|
| CURVATURE RADIUS | 1/C | | 47.32704 | 20.43138 | -94.4124 | -18.27486461 | -32.55955172 | -20.5164 |
| NORMALIZED RADIUS | R0 | | 10 | 10 | 10 | 1 | 1 | 10 |
| CONIC COEFFICIENT | k | | 0 | 0 | 0 | 0 | 0 | 0 |
| ASPHERICAL COEFFICIENT An,m | n | m | | | | | | |
| | 1 | 0 | 0 | 0 | 0 | 0 | 0 | 0 |
| | 0 | 1 | 0 | 0 | 0 | 0 | 0 | 0 |
| | 2 | 0 | 0.30111 | -0.65248 | 7.481127 | 0 | 0 | 22.199 |
| | 1 | 1 | 0 | 0 | 0 | 0 | 0 | 0 |
| | 0 | 2 | -1.49649 | -2.19068 | -0.97359 | 0 | 0 | -2.20855 |
| | 3 | 0 | 0 | 0 | 0 | 0 | 0 | 0 |
| | 2 | 1 | -0.38934 | -0.48843 | 4.307729 | 0 | 0 | 0.825022 |
| | 1 | 2 | 0 | 0 | 0 | 0 | 0 | 0 |
| | 0 | 3 | -0.17699 | -0.20942 | -1.57325 | 0 | 0 | -0.6926 |
| | 4 | 0 | 1.190703 | 0.462939 | 0.057625 | 0.000448014 | 0.000395598 | 115.6255 |
| | 3 | 1 | 0 | 0 | 0 | 0 | 0 | 0 |
| | 2 | 2 | 0.36527 | -0.18742 | 0.522778 | 0.000896029 | 0.000791197 | -30.5015 |
| | 1 | 3 | 0 | 0 | 0 | 0 | 0 | 0 |
| | 0 | 4 | -0.10208 | -0.05259 | 0.783201 | 0.000448014 | 0.000395598 | 0.171161 |
| | 5 | 0 | 0 | 0 | 0 | 0 | 0 | 0 |
| | 4 | 1 | -0.75152 | 0.310014 | 5.331907 | 0 | 0 | 69.49481 |
| | 3 | 2 | 0 | 0 | 0 | 0 | 0 | 0 |
| | 2 | 3 | 0.067009 | -0.5254 | 0.2932 | 0 | 0 | -2.61446 |
| | 1 | 4 | 0 | 0 | 0 | 0 | 0 | 0 |
| | 0 | 5 | -0.08797 | -0.26988 | 0.207203 | 0 | 0 | -0.27466 |
| | 6 | 0 | 2.007158 | 0.033345 | -1.17421 | -2.97E-06 | -8.19E-07 | 1182.16 |
| | 5 | 1 | 0 | 0 | 0 | 0 | 0 | 0 |
| | 4 | 2 | 0.637684 | -0.03644 | 12.61574 | -8.90E-06 | -2.46E-06 | -409.229 |
| | 3 | 3 | 0 | 0 | 0 | 0 | 0 | 0 |
| | 2 | 4 | 0.034959 | 0.704564 | -11.3076 | -8.90E-06 | -2.46E-06 | 6.221191 |
| | 1 | 5 | 0 | 0 | 0 | 0 | 0 | 0 |
| | 0 | 6 | 0.070356 | -0.1718 | -5.68874 | -2.97E-06 | -8.19E-07 | -0.66636 |

$$Z = \frac{c \cdot (x^2 + y^2)}{1 + \sqrt{1 - (1+K)c^2 \cdot (x^2 + y^2)}} + \sum\sum_{j=[(m+n)^2 + m + 3n]/2 + 1} (Cj(m,n) \times x^m \times y^n) \quad \text{(EQUATION 1)}$$

| SURFACE NUMBER | SURFACE INTERVAL | REFRACTIVE INDEX (nd) | ABBE NUMBER ($\nu$) |
|---|---|---|---|
| (3) | 7.7 | 1.531 | 56 |
| (4) | 4.9 | 1.531 | 56 |
| (3) | 2.5 | | |
| (5) | 6 | 1.531 | 56 |
| (6) | 1.2 | | |
| (7) | 2.3 | 1.585 | 30 |
| (8) | 2.1 | | |

FIG. 9

| LAYER NUMBER | PHYSICAL THICKNESS (nm) | MATERIALS |
|---|---|---|
| BASE MATERIAL | ARBITRARY | OPTICAL MEMBER |
| 1 | 7.098 | $TiO_2$ |
| 2 | 58.378 | $Al_2O_3$ |
| 3 | 75.903 | M |
| 4 | 25.744 | $TiO_2$ |
| 5 | 31.465 | $SiO_2$ |
| 6 | 28.222 | $TiO_2$ |
| 7 | 102.418 | M |
| 8 | 28.764 | $TiO_2$ |
| 9 | 42.038 | $SiO_2$ |
| 10 | 20.435 | $TiO_2$ |
| 11 | 88.754 | M |
| 12 | 119.658 | $TiO_2$ |
| 13 | 83.48 | M |
| 14 | 97.726 | $Al_2O_3$ |
| 15 | 200 | BONDING LAYER |

FIG. 10

| LAYER NUMBER | PHYSICAL THICKNESS (nm) | MATERIALS |
|---|---|---|
| BASE MATERIAL | ARBITRARY | OPTICAL MEMBER |
| 1 | 3.157 | $TiO_2$ |
| 2 | 227.284 | $SiO_2$ |
| 3 | 7.619 | $TiO_2$ |
| 4 | 57.528 | $SiO_2$ |
| 5 | 100.319 | M |
| 6 | 36.049 | $TiO_2$ |
| 7 | 19.922 | $SiO_2$ |
| 8 | 18.421 | $TiO_2$ |
| 9 | 100.108 | M |
| 10 | 24.211 | $TiO_2$ |
| 11 | 20.526 | $SiO_2$ |
| 12 | 34.656 | $TiO_2$ |
| 13 | 76.396 | M |
| 14 | 18.957 | $Al_2O_3$ |
| 15 | 200 | BONDING LAYER |

FIG. 11

| LAYER NUMBER | PHYSICAL THICKNESS (nm) | MATERIALS |
|---|---|---|
| BASE MATERIAL | ARBITRARY | OPTICAL MEMBER |
| 1 | 97.032 | M |
| 2 | 54.96 | $TiO_2$ |
| 3 | 26.701 | $SiO_2$ |
| 4 | 23.121 | $TiO_2$ |
| 5 | 81.188 | M |
| 6 | 98.62 | $TiO_2$ |
| 7 | 112.196 | M |
| 8 | 23.082 | $SiO_2$ |
| 9 | 35.801 | $TiO_2$ |
| 10 | 111.997 | M |
| 11 | 69.594 | $SiO_2$ |
| 12 | 7.762 | $TiO_2$ |
| 13 | 44.598 | $SiO_2$ |
| 14 | 89.237 | M |
| 15 | 33.709 | $TiO_2$ |
| 16 | 89.179 | M |
| 17 | 200 | BONDING LAYER |

LIGHT GUIDE DEVICE AND DISPLAY APPARATUS

BACKGROUND

1. Technical Field

The present disclosure relates to a light guide device and a display apparatus.

2. Related Art

As a light guide portion of a light guide device used in a display apparatus or the like, a configuration in which a plurality of obliquely-inclined half mirrors are provided in parallel between two flat surfaces (a first surface and a second surface) extending from one end side on which image light beams are incident toward another end side, has been proposed (refer to JP-A-2016-177231). In the light guide device, the image light beams are reflected between the first surface and the second surface, travel through the light guide portion from one end side toward another end side, and are emitted from the half mirrors toward an eye of an observer. Thus, the observer can recognize a virtual image, and light beams from the outside can reach the eye of the observer via the light guide portion.

JP-A-2017-3845 is an example of the related art.

However, when the image light beams travel through the light guide portion from the one end side toward another end side and are emitted from the half mirrors (partial reflection surfaces), the light beams reflected by a plurality of partial reflection surfaces are incident on the eye of the observer. At that time, an incident angle of the light beam, which is reflected by the partial reflection surface positioned on the one end side and is directed toward the eye, with respect to the partial reflection surface is different from an incident angle of the light beam, which is reflected by the partial reflection surface positioned on another end side and is directed toward the eye, with respect to the partial reflection surface. As a result, in a case where an incident angle dependence on a reflectance of each of the plurality of partial reflection surfaces is the same, there is a problem that intensity of the light beams reflected by a part of the plurality of partial reflection surfaces is remarkably reduced and brightness is reduced. However, in JP-A-2016-177231, a configuration for solving such a problem is not disclosed.

SUMMARY

An advantage of some aspects of the embodiment is to provide a light guide device and a display apparatus capable of increasing intensity of each light beam which is reflected by each of a plurality of partial reflection surfaces and is incident on an eye of an observer.

According to an aspect of the embodiment, there is provided a light guide device including: a transparent light guide portion that guides light beams from one end side to another end side in a first direction, in which the light guide portion includes a first surface that extends from the one end side toward the another end side, a second surface that extends in the first direction and in parallel to the first surface in one side of a second direction intersecting with the first direction, a plurality of partial reflection surfaces that are disposed along the first direction between the first surface and the second surface and are inclined at the same angle from a normal direction with respect to the second surface toward the one end side, and a light-emitting portion that is a portion of the second surface which overlaps with the plurality of partial reflection surfaces in one side of the second direction, the portion of the second surface being a portion on which the plurality of partial reflection surfaces are formed, and in which, in the plurality of partial reflection surfaces, an appropriate incident angle range of the partial reflection surface positioned on the one end side is set to a larger angle than that of the partial reflection surface positioned on the another end side such that, in the appropriate incident angle range, an incident angle dependence on a reflectance at a visible light wavelength region is lower than that in any other incident angle range.

In this configuration, when the light beams travel through the light guide portion from the one end side toward the another end side and are emitted from the partial reflection surfaces, the light beams reflected by the plurality of partial reflection surfaces are incident on an eye of an observer. At that time, an incident angle of the light beam, which is reflected by the partial reflection surface positioned on the one end side and is directed toward the eye, with respect to the partial reflection surface is larger than an incident angle of the light beam, which is reflected by the partial reflection surface positioned on the another end side and is directed toward the eye, with respect to the partial reflection surface. In this configuration, the appropriate incident angle range of the partial reflection surfaces positioned on the one end side is set to a larger angle than the appropriate incident angle range of the partial reflection surfaces positioned on the another end side. Therefore, it is possible to increase intensity of each light beam which is reflected by each of the plurality of partial reflection surfaces and is incident on the eye of the observer, and thus the observer can recognize an image with high brightness.

BRIEF DESCRIPTION OF THE DRAWINGS

The embodiment will be described with reference to the accompanying drawings, wherein like numbers reference like elements.

FIG. 3 is an explanatory diagram illustrating design examples of a projection lens system and a light-incident portion illustrated in FIG. 2.

FIG. 9 is an explanatory diagram illustrating a configuration example of the partial reflection surface of a first group illustrated in FIG. 7.

FIG. 10 is an explanatory diagram illustrating a configuration example of the partial reflection surface of a second group illustrated in FIG. 7.

FIG. 11 is an explanatory diagram illustrating a configuration example of the partial reflection surface of a third group illustrated in FIG. 7.

DESCRIPTION OF EXEMPLARY EMBODIMENTS

Figure 1:
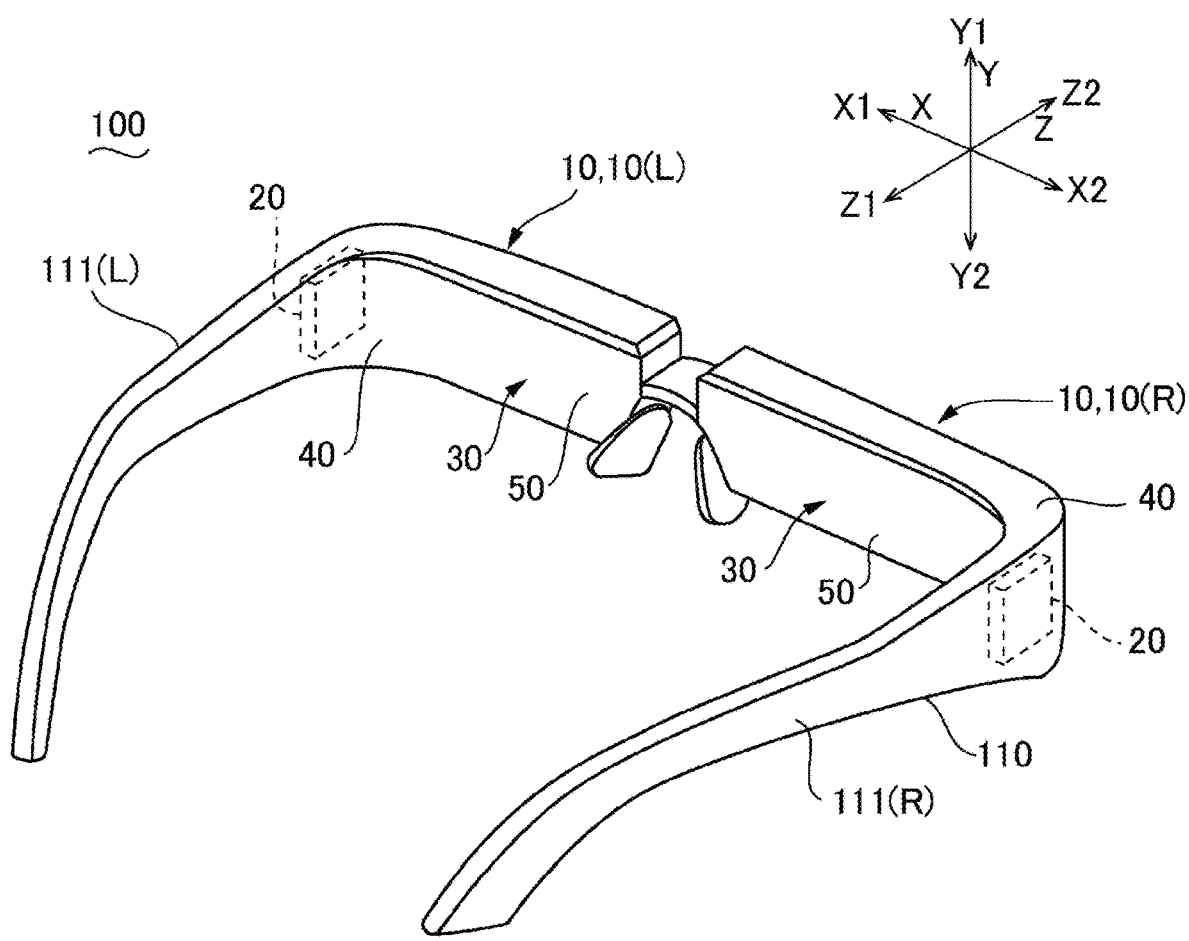
FIG. 1 is an explanatory view illustrating an example of an appearance of a display apparatus according to a first embodiment.

Hereinafter, embodiments according to the disclosure will be described. In the drawings to be referred to in the following description, in order to make each layer and each member to be recognizable on the drawings, the number and the scale of each layer and each member are made different.

First Embodiment

Overall Configuration

FIG. 1 is an explanatory view schematically illustrating an example of an appearance of a display apparatus 100 according to a first embodiment. The display apparatus 100 illustrated in FIG. 1 is configured with a see-through type eye glass display or the like, and includes a frame 110 provided with temples 111(R) and 111(L) on left and right sides thereof. In the display apparatus 100, a display unit 10 to be described is supported by the frame 110, and an image emitted from the display unit 10 is recognized by a user, as a virtual image. In the present embodiment, the display apparatus 100 includes a right-eye display unit 10(R) and a left-eye display unit 10(L) as the display unit 10. The right-eye display unit 10(R) and the left-eye display unit 10(L) have the same configuration, and are disposed symmetrically in a right-left direction. Thus, in the following description, the left-eye display unit 10(L) will be mainly described, and a description of the right-eye display unit 10(R) will be omitted. In the following description, a right-left direction is referred to as a first direction X, a front-rear direction is referred to as a second direction Z, and an upper-and-lower direction is referred to as a third direction Y. In addition, one side (left side) in the first direction X is referred to as X1, the other side (right side) in the first direction X is referred to as X2, one side (rear side) in the second direction Z is referred to as Z1, the other side (front side) in the second direction Z is referred to as Z2, one side (upper side) in the third direction Y is referred to as Y1, and the other side (lower side) in the third direction Y is referred to as Y2.

Here, since the right-eye display unit 10(R) and the left-eye display unit 10(L) are disposed symmetrically, in the right-eye display unit 10(R) and the left-eye display unit 10(L), one side X1 and the other side X2 in the first direction X are reversed to each other in a right-left direction.

Overall Configuration of Display Unit 10

Figure 2:
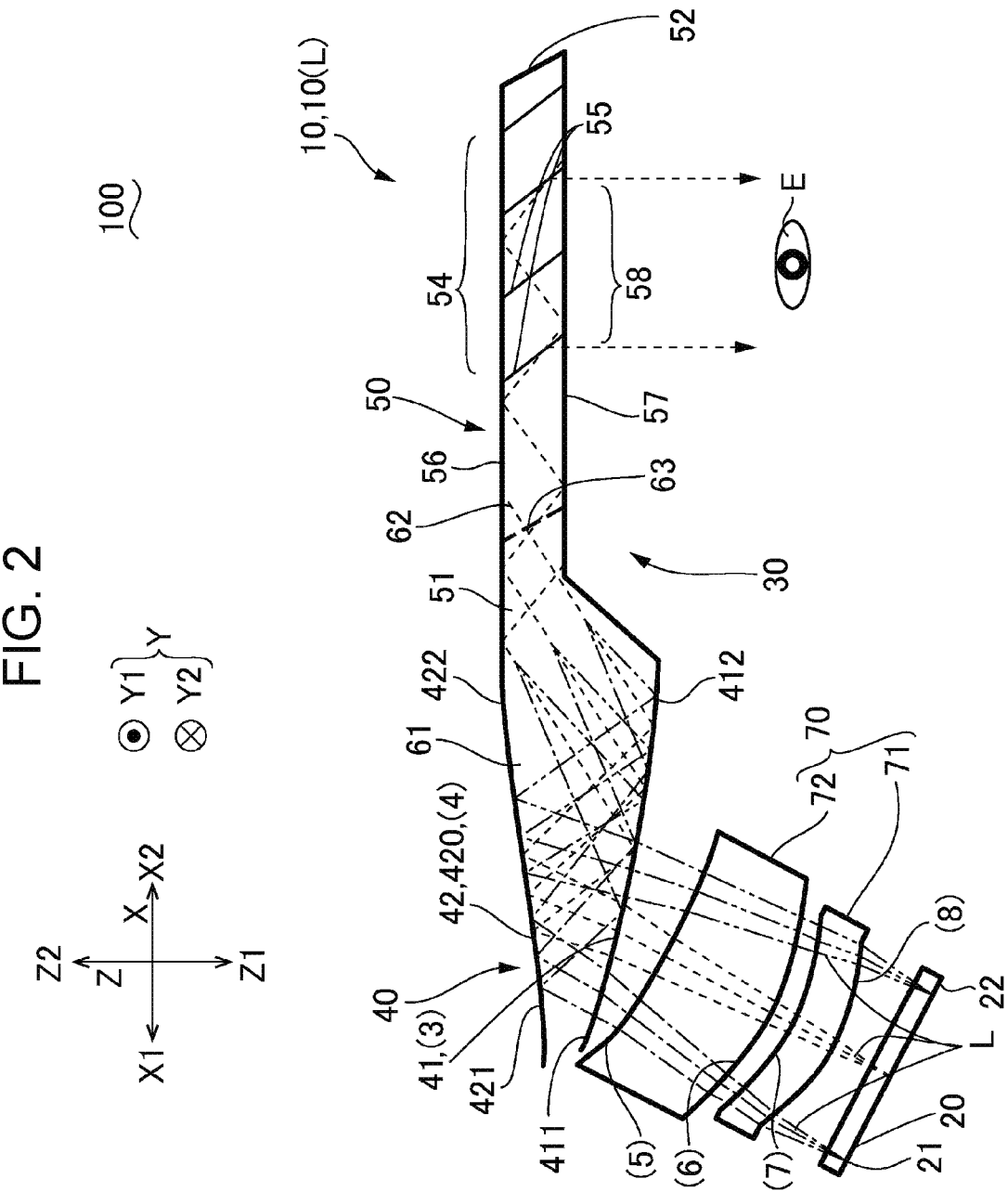
FIG. 2 is a plan view of an optical system of the display apparatus illustrated in FIG. 1.

FIG. 2 is a plan view of an optical system of the display unit 10 illustrated in FIG. 1. In FIG. 2, image light beams L emitted from the center of an image generation system 20 are illustrated by dotted lines, and image light beams L emitted from end portions of the image generation system 20 are illustrated by one-dot chain lines and two-dot chain lines.

As illustrated in FIG. 2, the display unit 10 (display unit 10(R)) includes an image generation system 20 that emits image light beams L as non-parallel light beams and a light guide system 30 that guides the incident image light beams L to a light-emitting portion 58, and the light guide system 30 is a light guide device to which the embodiment is applied. In the present embodiment, a projection lens system 70 is disposed between the image generation system 20 and the light guide system 30, and the image light beams L emitted from the image generation system 20 are incident on the light guide system 30 via the projection lens system 70. The projection lens system 70 includes two lenses including a first lens 71 and a second lens 72 disposed between the first lens 71 and the light guide system 30.

The light guide system 30 includes a transparent light-incident portion 40 that includes a light-incident curved surface 41 on which the image light beams L are incident and a light-reflective curved surface 42 which reflects the image light beams L incident from the light-incident curved surface 41 between the light-incident curved surface 41 and the light-reflective curved surface 42 such that the reflected image light beams L are converted into parallel light beams, and a transparent light guide portion 50 of which one end 51 side in the first direction X is connected to the light-incident portion 40. The light guide portion 50 guides the parallel light beams which are incident from the light-incident portion 40, to the light-emitting portion 58. The light guide portion 50 includes a first surface 56 (first reflection surface) extending from the one end 51 (end portion in one side X1) toward the other end 52 in the first direction X (end portion in the other side X2), a second surface 57 (second reflection surface) extending in the first direction X in parallel with the first surface 56 and in one side Z1 of the second direction Z intersecting with the first direction X, and the light-emitting portion 58 which is provided at a portion of the second surface 57 that is separated from the light-incident portion 40. In the light guide system 30 with this configuration, the parallel light beams emitted from the light-incident portion 40 to the light guide portion 50 are reflected between the first surface 56 and the second surface 57, are guided to the light-emitting portion 58 from one side X1 to the other side X2 in the first direction X, and are emitted from the light-emitting portion 58.

Detailed Configuration of Image Generation System 20

The image generation system 20 is a light modulation panel configured with a liquid crystal device, an organic electroluminescence device, or the like, and is disposed so as to face the light-incident curved surface 41 in one side X1 of the first direction X and in one side Z1 of the second direction Z with respect to the light-incident portion 40. In the present embodiment, the image generation system 20 is disposed obliquely such that an end portion 21 thereof in one side X1 of the first direction X is positioned toward the other side Z2 of the second direction Z than the other end portion 22 thereof in the other side X2 of the first direction X is.

Detailed Configuration of Light-Incident Portion 40

In the light-incident portion 40, the light-incident curved surface 41 is a surface toward one side Z1 of the second direction Z, and faces the image generation system 20 via the projection lens system 70. Thus, the light-incident curved surface 41 is disposed obliquely such that an end portion 411 in the other side Z2 of the second direction Z is positioned toward one side X1 of the first direction X than an end portion 412 in one side Z1 of the second direction Z is. On the other hand, a distance between the end portion 412 of the light-incident curved surface 41 and the end portion 22 of the image generation system 20 is wider than a distance between the end portion 411 of the light-incident curved surface 41 and the end portion 21 of the image generation system 20. The light-incident curved surface 41 is made of a curved surface such as an aspherical surface or a free curved surface, and in the present embodiment, the light-incident curved surface 41 is made of a convex-shaped free curved surface. Although a reflection film or the like is not formed on the light-incident curved surface 41, the light-incident curved surface 41 totally reflects light beams which are incident at an incident angle equal to or larger than a critical angle. Thus, the light-incident curved surface 41 has transparency and reflectivity.

The light-reflective curved surface 42 is a surface toward the other side Z2 of the second direction Z, and is disposed obliquely such that an end portion 421 in one side X1 of the first direction X is positioned toward one side Z1 of the second direction Z than an end portion 422 in the other side X2 of the first direction X is. The light-reflective curved surface 42 is made of a curved surface such as an aspherical surface or a free curved surface, and in the present embodiment, the light-reflective curved surface 42 is made of a convex-shaped free curved surface. The light-reflective curved surface 42 may employ a configuration in which a reflection film or the like is not formed and light beams incident at an incident angle equal to or larger than a critical angle are totally reflected. Here, in the present embodiment, the light-reflective curved surface 42 is provided with a reflective metal layer 420 including aluminum, silver, magnesium, chromium, or the like as a main component. Thus, even in a case where the incident angle with respect to the light-reflective curved surface 42 is small, the light-reflective curved surface 42 can reliably reflect the incident light beams.

In the light-incident portion 40 with this configuration, when the image light beams L as non-parallel light beams are incident on the light-incident curved surface 41, the image light beams L incident from the light-incident curved surface 41 are refracted by the light-incident curved surface 41, and are directed toward the light-reflective curved surface 42. Next, the image light beams L are reflected by the light-reflective curved surface 42, and are directed again toward the light-incident curved surface 41. At this time, since the image light beams L are incident on the light-incident curved surface 41 at an incident angle equal to or larger than a critical angle, the image light beams L are reflected by the light-incident curved surface 41 toward the light guide portion 50. Meanwhile, the image light beams L are converted into parallel light beams. Therefore, since the image light beams L are converted into parallel light beams by using the light-reflective curved surface 42 and the light-incident curved surface 41, a design requirement for the projection lens system 70 can be relaxed. Thereby, it is possible to simplify the projection lens system 70. For example, the projection lens system 70 can be configured with two lenses (the first lens 71 and the second lens 72). In addition, since the projection lens system 70 can be simplified, it is possible to reduce a size and a weight of the display apparatus 100 (display unit 10).

Design Examples of Projection Lens System 70 and Light-Incident Portion 40

FIG. 3 is an explanatory diagram illustrating design examples of the projection lens system 70 and the light-incident portion 40 illustrated in FIG. 2. The first lens 71, the second lens 72, the light-incident curved surface 41, and the light-reflective curved surface 42 are configured as illustrated in FIG. 3. In an upper portion of FIG. 3, coefficients of a free curved surface which is represented by Equation 1 illustrated in FIG. 3 are indicated. In a lower portion of FIG. 3, a refractive index (nd) and an Abbe number (v) of a material that constitutes the first lens 71, the second lens 72, and the light-incident portion 40 are indicated. Among surface numbers (3) to (8) illustrated in FIG. 3, a surface number (3) corresponds to the light-incident curved surface 41, and a surface number (4) corresponds to the light-reflective curved surface 42. A surface number (5) corresponds to a lens surface of the second lens 72 on a light-emitting side, and a surface number (6) corresponds to a lens surface of the second lens 72 on a light-incident side. A surface number (7) corresponds to a lens surface of the first lens 71 on a light-emitting side, and a surface number (8) corresponds to a lens surface of the first lens 71 on a light-incident side.

Detailed Configuration of Light Guide Portion 50

Referring to FIG. 2 again, the first surface 56 and the second surface 57 of the light guide portion 50 are disposed in parallel, and the light guide portion 50 includes a third surface between the first surface 56 and the second surface 57, the third surface being disposed on the other end 52 of the light guide portion 50. A thickness between the first surface 56 and the second surface 57 in the second direction Z (a dimension of the light guide portion 50 in the second direction Z) is thinner than a dimension of the light-incident portion 40 in the second direction Z. The first surface 56 and the second surface 57 totally reflect the light beams which are incident at an incident angle equal to or larger than a critical angle, according to a difference in refractive index between the light guide portion 50 and the outside (air).

Therefore, a reflection film or the like is not formed on the first surface 56 and the second surface 57.

At a portion of the light guide portion 50 that is separated from the light-incident portion 40, a plurality of partial reflection surfaces 55 are disposed parallel to each other along the first direction X, the partial reflection surfaces 55 being inclined toward one side X1 of the first direction X from a normal direction with respect to the second surface 57 when viewed from the third direction Y. The light-emitting portion 58 is a portion of the second surface 57 that overlaps with the plurality of partial reflection surfaces 55 in the first direction X, and is a region with a predetermined width in the first direction X.

Each of the plurality of partial reflection surfaces 55 is made of a dielectric multilayer film. In addition, at least one of the plurality of partial reflection surfaces 55 may be a composite layer of a dielectric multilayer film and a reflective metal layer (thin film) including aluminum, silver, magnesium, chromium, or the like as a main component. In a case where the partial reflection surface 55 is configured to include a metal layer, there is an effect in that a reflectance of the partial reflection surface 55 can be increased, and in that an incident angle dependence and a polarization dependence on a transmittance and a reflectance of the partial reflection surface 55 can be optimized.

In the light guide portion 50 with this configuration, the image light beams L as parallel light beams which are incident from the light-incident portion 40 are reflected between the first surface 56 and the second surface 57, and travel from one side X1 to the other side X2 in the first direction X. A part of the image light beams L incident on the partial reflection surface 55 is reflected by the partial reflection surface 55, and is emitted from the light-emitting portion 58 toward an eye E of an observer. In addition, the rest of the image light beams L incident on the partial reflection surface 55 pass through the partial reflection surface 55, and are incident on the next partial reflection surface 55 which is adjacent to the partial reflection surface 55 in the other side X2 of the first direction X. Thus, in each of the plurality of partial reflection surfaces 55, the image light beams L reflected toward one side Z1 of the second direction Z are emitted from the light-emitting portion 58 toward the eye E of the observer. Therefore, the observer can recognize a virtual image. At that time, when light beams are incident from the outside to the light guide portion 50, the light beams are incident on the light guide portion 50, pass through the partial reflection surface 55, and reach the eye E of the observer. Therefore, the observer can see the image generated by the image generation system 20, and can see a scenery or the like of the outside in a see-through manner.

State of Parallel Light Flux in Light Guide Portion 50

Figure 4:
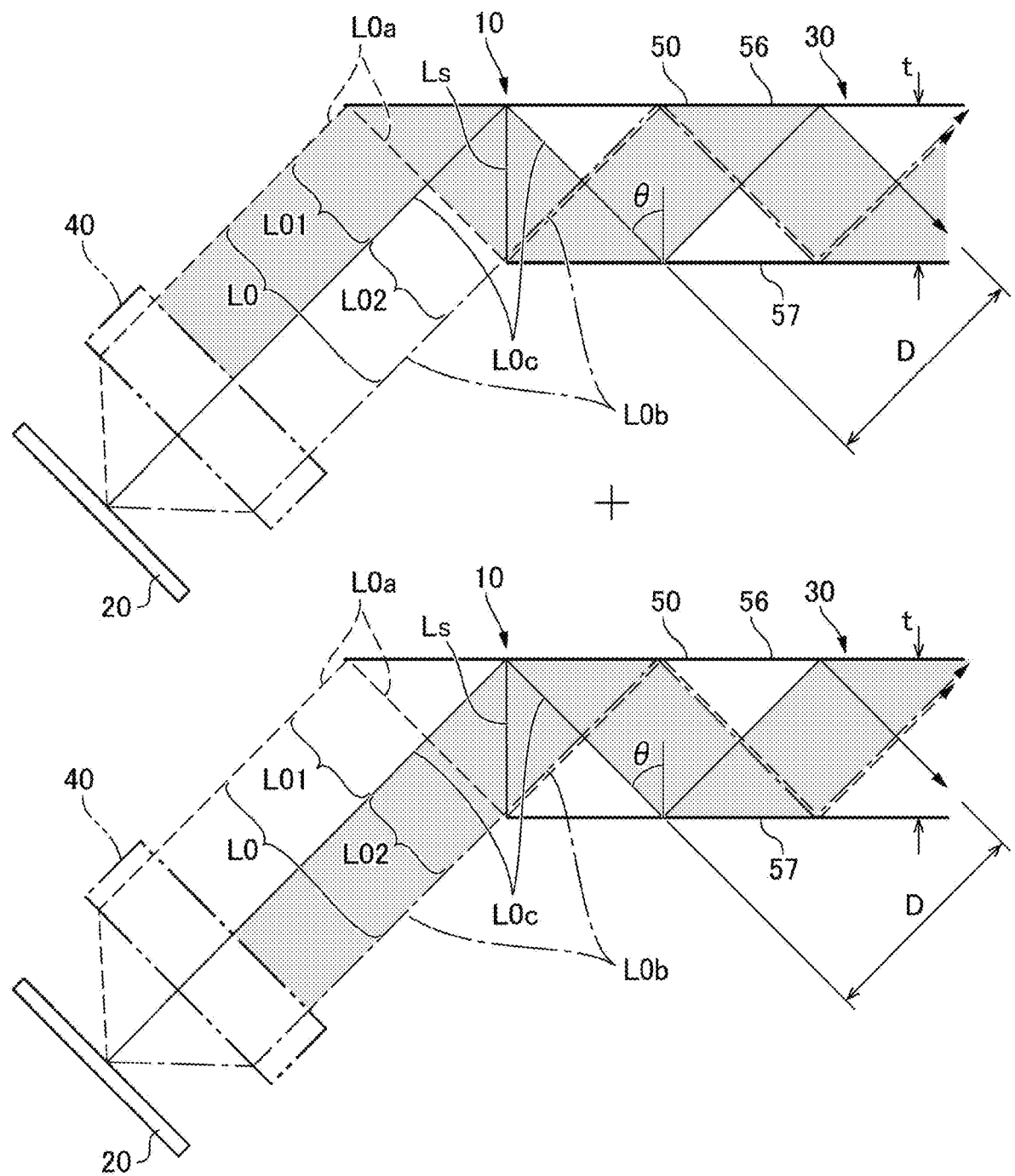
FIG. 4 is an explanatory diagram schematically illustrating a state of a parallel light flux in a light guide portion illustrated in FIG. 2.

FIG. 4 is an explanatory diagram schematically illustrating a state of a parallel light flux in the light guide portion 50 illustrated in FIG. 2, and schematically illustrates a state where a non-parallel light flux is converted into a parallel light flux L0 (image light beam L) by the light-incident portion 40 and then the parallel light flux L0 is viewed from the third direction Y, the non-parallel light flux being incident on the light-incident curved surface 41 of the light-incident portion 40 from the same portion of the image generation system 20 via the projection lens system 70. In FIG. 4, a center light beam L0c of the parallel light flux L0 is illustrated by a solid line, a first light beam L0a which is positioned at one end portion of the parallel light flux L0 is illustrated by a long broken line, and a second light beam L0b which is positioned at the other end portion of the parallel light flux L0 is illustrated by a one-dot chain line. In addition, in an upper portion of FIG. 4, a first parallel light flux portion L01 interposed between the center light beam L0c and the first light beam L0a is illustrated by a gray color, and in a lower portion of FIG. 4, a second parallel light flux portion L02 interposed between the center light beam L0c and the second light beam L0b is illustrated by a gray color.

As illustrated in FIG. 4, in the display unit 10, when the non-parallel light flux is converted into a parallel light flux L0 by the light-incident portion 40 and then the parallel light flux L0 is viewed from the third direction Y, the non-parallel light flux being incident on the light-incident curved surface 41 of the light-incident portion 40 from the same portion of the image generation system 20, the inside of one end portion (a portion in one side X1 of the first direction X) of the light guide portion 50 at which the light-incident portion 40 is positioned is filled with the parallel light flux L0. More specifically, in the parallel light flux L0, when the first parallel light flux portion L01 (gray portion) interposed between the center light beam L0c and the first light beam L0a is combined with the second parallel light flux portion L02 (gray portion) interposed between the center light beam L0c and the second light beam L0b of the parallel light flux L0, the inside of the light guide portion 50 is filled with the parallel light flux L0. Therefore, even when a thickness of the light guide portion 50 in the second direction Z is thin, the observer can recognize a virtual image with high brightness.

For example, assuming that the first surface 56 and the second surface 57 are parallel to each other, that a light flux diameter of the parallel light flux L0 is D, that a distance between the first surface 56 and the second surface 57 in the second direction Z is t, and that an incident angle of the parallel light flux L0 with respect to the first surface 56 and the second surface 57 is $\theta$, such a configuration can be realized by setting the light flux diameter D, the distance t, and the incident angle $\theta$ so as to satisfy the following conditional equation.

$$D = 2t \times \sin\theta$$

In other words, positions at which the first light beam L0a and the second light beam L0b are incident on the second surface 57 are set so as to be positioned on an imaginary normal line Ls at a position at which the center light beam L0c is incident on the first surface 56, and thus the configuration can be realized. As illustrated in FIG. 2, although the image light beams L are emitted from each portion of the image generation system 20, in the present embodiment, the image light beams L emitted from each portion of the image generation system 20 satisfy the above condition.

Bonding Structure

Referring to FIG. 2 again, in the present embodiment, the light-incident portion 40 is formed of a first transparent member 61, a portion 54 of the light guide portion 50 at which at least the plurality of partial reflection surfaces 55 are formed is formed of a second transparent member 62 which is surface-bonded to the first transparent member 61 via a bonding surface 63 in the first direction X. The bonding surface 63 is positioned between the partial reflection surface 55 positioned closest to the one end 51 and the light-incident portion 40. Therefore, the light-incident portion 40 and the partial reflection surfaces 55 can be manufactured by an appropriate method. For example, the light-incident portion 40 is configured with a resin molded component made of a cycloolefin polymer or the like, while the portion 54 of the light guide portion 50 at which the plurality of partial reflection surfaces 55 are formed is formed by stacking transparent substrates with the partial reflection surfaces 55 interposed therebetween via a bonding layer and cutting the transparent substrates. In the present embodiment, the bonding surface 63 is disposed at an intermediate position between the portion 54 of the light guide portion 50 at which the partial reflection surfaces 55 are formed and the light-incident portion 40.

Detailed Configuration of Partial Reflection Surface 55

Figure 5:
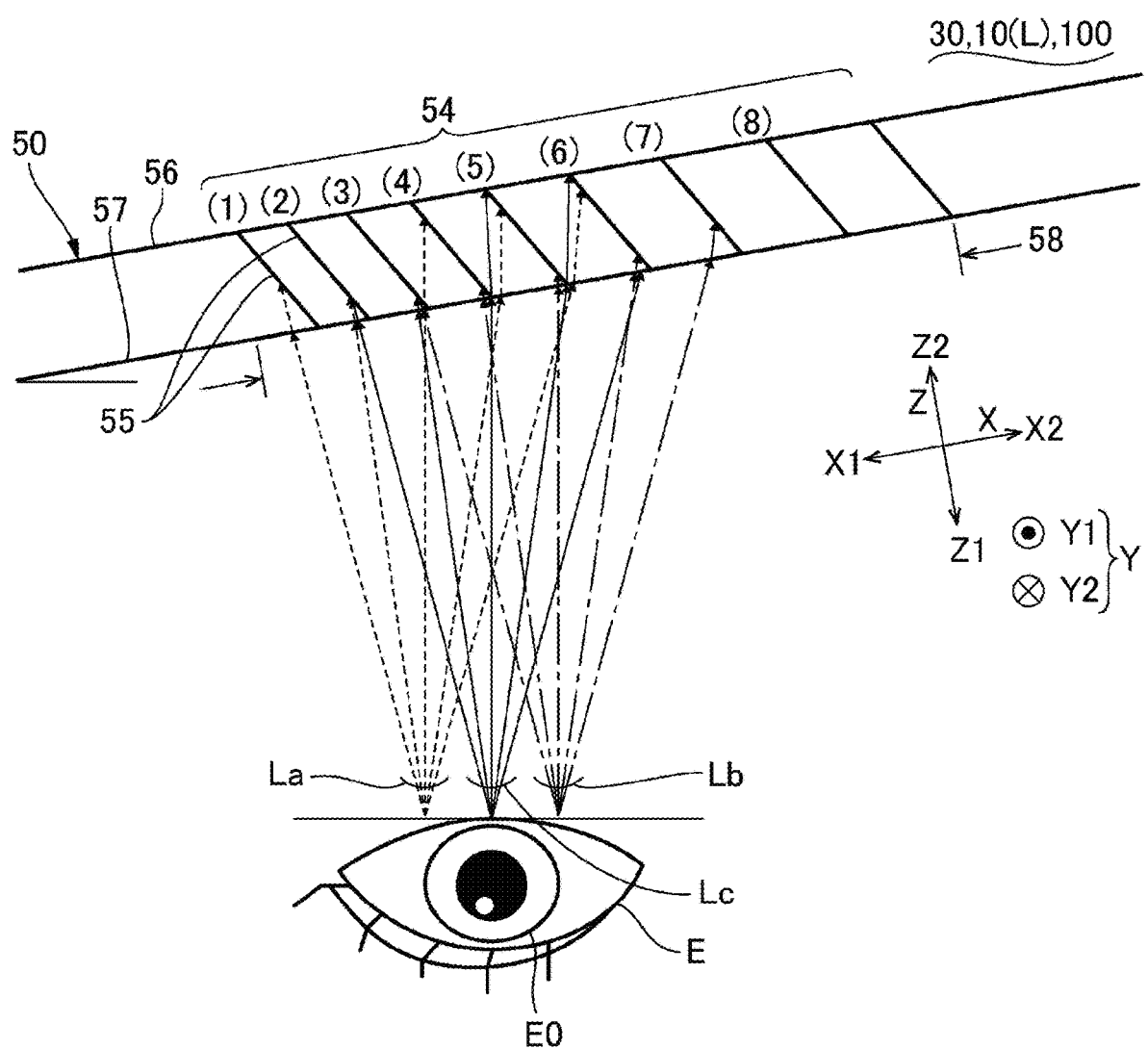
FIG. 5 is an explanatory diagram of partial reflection surfaces illustrated in FIG. 2.

FIG. 5 is an explanatory diagram of the partial reflection surfaces 55 illustrated in FIG. 2, and illustrates a state when a light path of each light beam incident on the eye E is viewed from the eye E side in a state where the light-emitting portion 58 is disposed in front of the eye. In FIG. 5, a light path when the eye E is positioned at the center in the first direction X is illustrated by a solid line Lc. In addition, in FIG. 5, light paths when the eye E moves toward one side X1 of the first direction X (toward the one end 51, toward a left side of a movable range) are illustrated by broken lines La, and light paths when the eye E moves toward the other side X2 of the first direction X (toward the other end 52, toward a right side of a movable range) are illustrated by one-dot chain lines Lb. In addition, in FIG. 5, a parenthesis indicating an order from the one end 51 is attached to each of the plurality of partial reflection surfaces 55. In FIG. 5, a diameter of a pupil E0 is approximately 3 mm, and a state where a position of the pupil E0 moves to the left and the right by 2.5 mm is illustrated. In addition, a state where light beams with a horizontal viewing angle of approximately 15° in a half angle are incident on the eye E, is illustrated.

Figure 6:
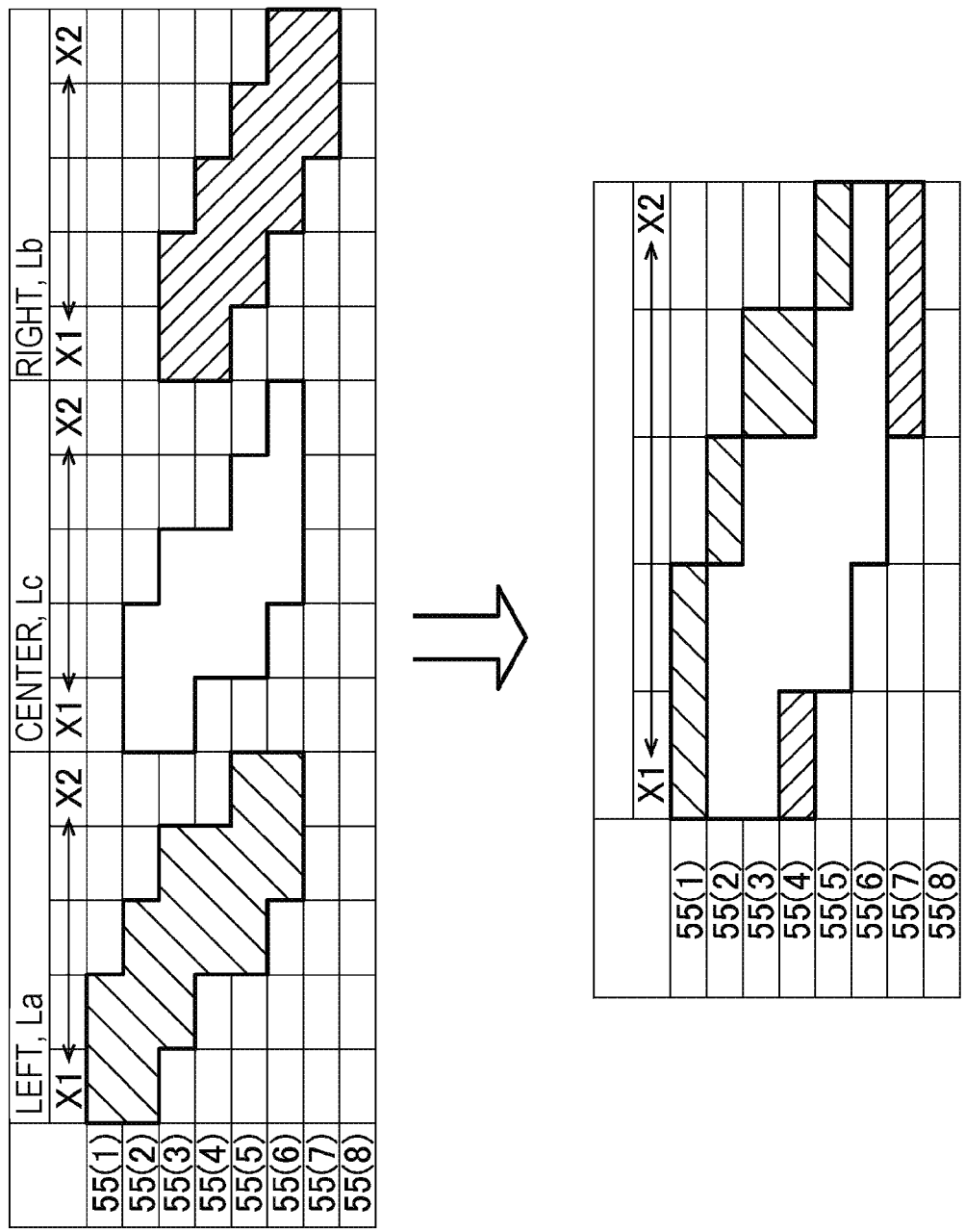
FIG. 6 is an explanatory diagram illustrating from which directions light beams reflected by a plurality of partial reflection surfaces illustrated in FIG. 5 are incident on an eye.

FIG. 6 is an explanatory diagram illustrating from which directions the light beams reflected by the plurality of partial reflection surfaces 55 illustrated in FIG. 5 are incident on the eye E. In an upper portion of FIG. 6, in a case where the eye E is positioned at the center, the left side, and the right side, a state where the light beams reflected by each of the partial reflection surfaces 55(1) to 55(8) are incident on the eye E from each angle direction in the first direction X, is illustrated. In a lower portion of FIG. 6, the results illustrated in the upper portion of FIG. 6 are superimposed. In FIG. 6, a range of incidence on the eye E in a case where the eye E is positioned at the center is illustrated by a blank range, a range of incidence on the eye E in a case where the eye E is positioned at the left side is illustrated by a range with a hatched line toward upper right, and a range of incidence on the eye E in a case where the eye E is positioned at the right side is illustrated by a range with a hatched line toward lower right.

In the light guide system 30 illustrated in FIG. 5, the plurality of partial reflection surfaces 55 are disposed in the light guide portion 50 at an angle of 60° with respect to the first surface 56. In addition, the plurality of partial reflection surfaces 55 are disposed such that intervals between the partial reflection surfaces are widened from the one end 51 toward the other end 52. Therefore, when viewed from the eye E, between the two adjacent partial reflection surfaces 55 on the one end 51 side and the other end 52 side, a wide overlapped portion or a wide gap between the partial reflection surfaces 55 is not present. In addition, since the light guide portion 50 is disposed obliquely such that the other end 52 side is separated from a face, when viewed from the eye E, the partial reflection surface 55 are directed toward a large area.

As illustrated in FIGS. 5 and 6, in a case where the eye E is positioned at the center in the first direction X, as illustrated by the solid lines Lc, the light beams reflected by the second to sixth partial reflection surfaces 55 are refracted by the second surface 57, and are incident on the eye E from each angle direction. At this time, an incident angle of the light beam, which is reflected by the partial reflection surface 55 positioned on the one end 51 side and is directed toward the eye E, with respect to the partial reflection surface 55 is larger than an incident angle of the light beam, which is reflected by the partial reflection surface 55 positioned on the other end 52 side and is directed toward the eye E, with respect to the partial reflection surface 55. For example, the incident angle of the light beam, which is reflected by the second partial reflection surface 55(2) positioned on the one end 51 side and is directed toward the eye E, with respect to the second partial reflection surface 55(2) is larger than the incident angle of the light beam, which is reflected by the sixth partial reflection surface 55(6) positioned on the other end 52 side and is directed toward the eye E, with respect to the sixth partial reflection surface 55(6).

In addition, in a case where the eye E is moved toward one side X1 of the first direction X, as illustrated by the broken lines La, the light beams reflected by the first to sixth partial reflection surfaces 55 are refracted by the second surface 57, and then are incident on the eye E from each angle direction. At this time, the incident angle of the light beam, which is reflected by the partial reflection surface 55 positioned on the one end 51 side and is directed toward the eye E, with respect to the partial reflection surface 55 is larger than the incident angle of the light beam, which is reflected by the partial reflection surface 55 positioned on the other end 52 side and is directed toward the eye E, with respect to the partial reflection surface 55. For example, the incident angle of the light beam, which is reflected by the first partial reflection surface 55(1) positioned on the one end 51 side and is directed toward the eye E, with respect to the first partial reflection surface 55(1) is larger than the incident angle of the light beam, which is reflected by the sixth partial reflection surface 55(6) positioned on the other end 52 side and is directed toward the eye E, with respect to the sixth partial reflection surface 55(6). On the other hand, in a case where the eye E is moved toward the other side X2 of the first direction X, as illustrated by the one-dot chain lines Lb, the light beams reflected by the third to seventh partial reflection surfaces 55 are refracted by the second surface 57, and then are incident on the eye E from each angle direction. At this time, the incident angle of the light beam, which is reflected by the partial reflection surface 55 positioned on the one end 51 side and is directed toward the eye E, with respect to the partial reflection surface 55 is larger than the incident angle of the light beam, which is reflected by the partial reflection surface 55 positioned on the other end 52 side and is directed toward the eye E, with respect to the partial reflection surface 55. For example, the incident angle of the light beam, which is reflected by the third partial reflection surface 55(3) positioned on the one end 51 side and is directed toward the eye E, with respect to the third partial reflection surface 55(3) is larger than the incident angle of the light beam, which is reflected by the seventh partial reflection surface 55(7) positioned on the other end 52 side and is directed toward the eye E, with respect to the seventh partial reflection surface 55(7).

In the present embodiment, as described below with reference to FIGS. 6 and 7, in the plurality of partial reflection surfaces 55, an appropriate incident angle range of the partial reflection surface 55 positioned on the one end 51 side is set to a larger angle than that of the partial reflection surface 55 positioned on the other end 52 side, and in the appropriate incident angle range, the incident angle dependence on the reflectance at a visible light wavelength region is lower than that in any other incident angle range. In addition, the reflectance in the appropriate incident angle range is higher than that in any other incident angle range.

Appropriate Incident Angle Range of Each Partial Reflection Surface 55

Figure 7:
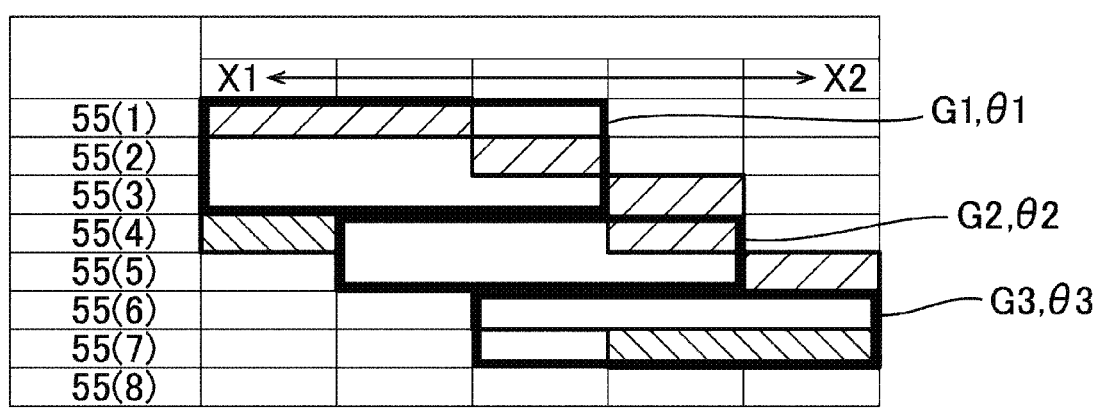
FIG. 7 is an explanatory diagram illustrating a manner in which appropriate incident angle ranges are set by grouping the partial reflection surfaces illustrated in FIG. 5.

FIG. 7 is an explanatory diagram illustrating a manner in which the appropriate incident angle ranges are set by grouping the partial reflection surfaces 55 illustrated in FIG. 5. As a configuration in which the appropriate incident angle range of the partial reflection surface 55 positioned on the one end 51 side is set to a larger angle than the appropriate incident angle range of the partial reflection surface 55 positioned on the other end 52 side, a configuration in which the appropriate incident angle range is set for each of the partial reflection surfaces 55, or a configuration in which the partial reflection surfaces 55 are grouped into groups of a number less than the number of the partial reflection surfaces 55 and the appropriate incident angle range is set for each group of the partial reflection surfaces 55, may be adopted. In the latter case, for example, the partial reflection surfaces 55 are divided into three to five groups, and the appropriate incident angle range is set for each group of the partial reflection surfaces 55.

In the present embodiment, the partial reflection surfaces 55 are divided into three groups, and the appropriate incident angle range is set for each group of the partial reflection surfaces 55. More specifically, as illustrated in FIG. 7, in correspondence with the incident angle of each light beam incident on the eye E with respect to the partial reflection surfaces 55, the first to third partial reflection surfaces 55(1) to 55(3) positioned on the one end 51 side are set in a first group G1 with an appropriate incident angle range $\theta1$, the fourth and fifth partial reflection surfaces 55(4) and 55(5) are set in a second group G2 with an appropriate incident angle range $\theta2$, and the sixth and seventh partial reflection surfaces 55(6) and 55(7) are set in a third group G3 with an appropriate incident angle range $\theta3$. Here, the appropriate incident angle ranges $\theta1$, $\theta2$, and $\theta3$ have the following relationship.

$$\theta1 > \theta2 > \theta3$$

In the present embodiment, the appropriate incident angle ranges $\theta1$, $\theta2$, and $\theta3$ are ranges satisfying the above condition. For example, $\theta1$ is set within a range from 53.3° to 63.3°, $\theta2$ is set within a range from 48.5° to 58.4°, and $\theta3$ is set within a range from 43.7° to 53.3°. The eighth partial reflection surface 55(8) may be included in the third group G3, or may be included in the fourth group (not illustrated).

As described above, in the present embodiment, when the image light beams L travel through the light guide portion 50 from the one end 51 side toward the other end 52 side and are emitted from the partial reflection surface 55, the light beams reflected by the plurality of partial reflection surfaces 55 are incident on the eye E of the observer. At this time, the incident angle of the light beam, which is reflected by the partial reflection surface 55 positioned on the one end 51 side and is directed toward the eye E, with respect to the partial reflection surface 55 is larger than the incident angle of the light beam, which is reflected by the partial reflection surface 55 positioned on the other end 52 side and is directed toward the eye E, with respect to the partial reflection surface 55. On the other hand, in the present embodiment, the appropriate incident angle range of the partial reflection surface 55 positioned on the one end 51 side is set to a larger angle than the appropriate incident angle range of the partial reflection surface 55 positioned on the other end 52 side. Therefore, it is possible to increase intensity of each light beam which is reflected by each of the plurality of partial reflection surfaces 55 and is incident on the eye E of the observer, and thus the observer can recognize the image with high brightness.

In addition, in the present embodiment, since the partial reflection surfaces 55 are divided into a plurality of groups and the appropriate incident angle range is set for each group of the partial reflection surfaces 55, it is possible to facilitate a design of the partial reflection surfaces 55 while increasing the intensity of each light beam which is reflected by each of the plurality of partial reflection surfaces 55 and is incident on the eye E of the observer. In this grouping, in a case where the eye E is positioned at the center of the movable range in the first direction X (right and left direction) (corresponding to a blank portion in FIG. 7), the groups are set such that the incident angles of the light beams directed toward the eye E of the observer are within the appropriate incident angle range. Therefore, in a case where the eye E is positioned at the center of the movable range in the first direction X (right and left direction), it is possible to increase the intensity of each light beam which is reflected by each of the partial reflection surfaces 55 and is incident on the eye E of the observer, and thus the observer can recognize the image with high brightness.

Configuration Example of Partial Reflection Surface 55

Figure 8:
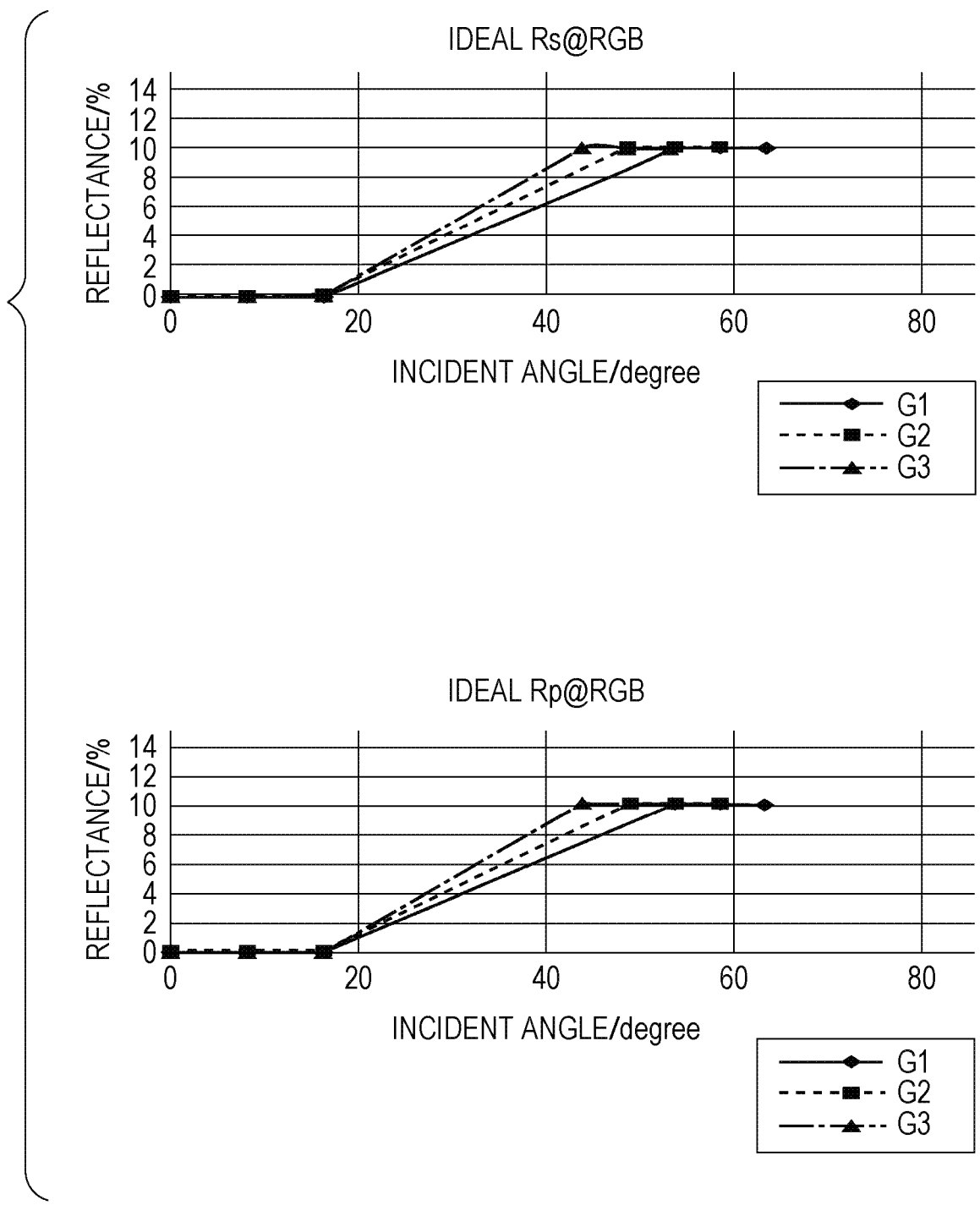
FIG. 8 is a graph illustrating an ideal incident angle dependence on a reflectance of the partial reflection surface for each group illustrated in FIG. 7.
Figure 12:
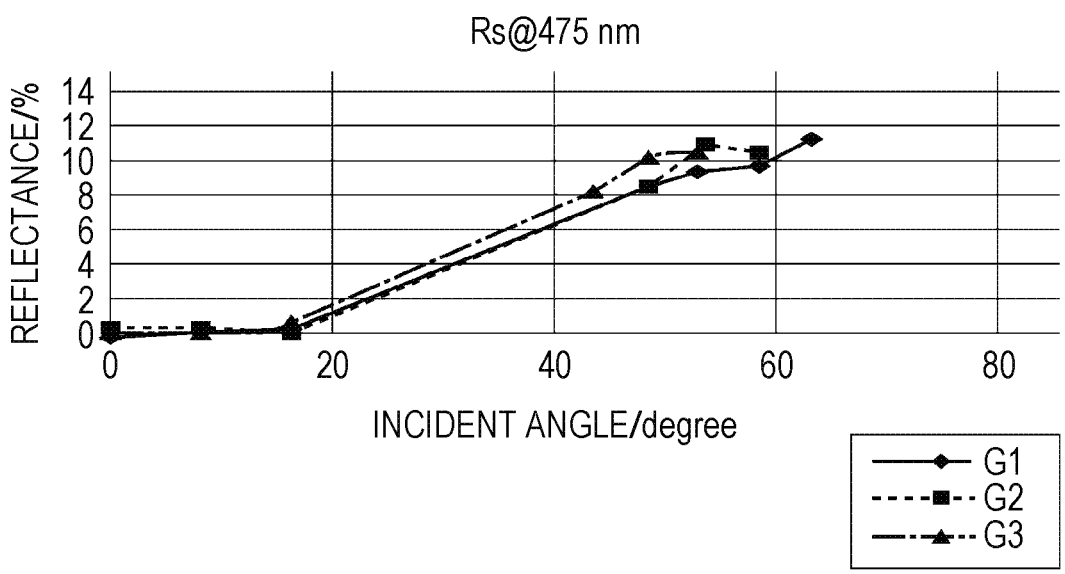
FIG. 12 is a graph illustrating the incident angle dependence on the reflectance of each of the partial reflection surfaces illustrated in FIGS. 9, 10 and 11 for light beams having a wavelength of 475 nm.
Figure 12:
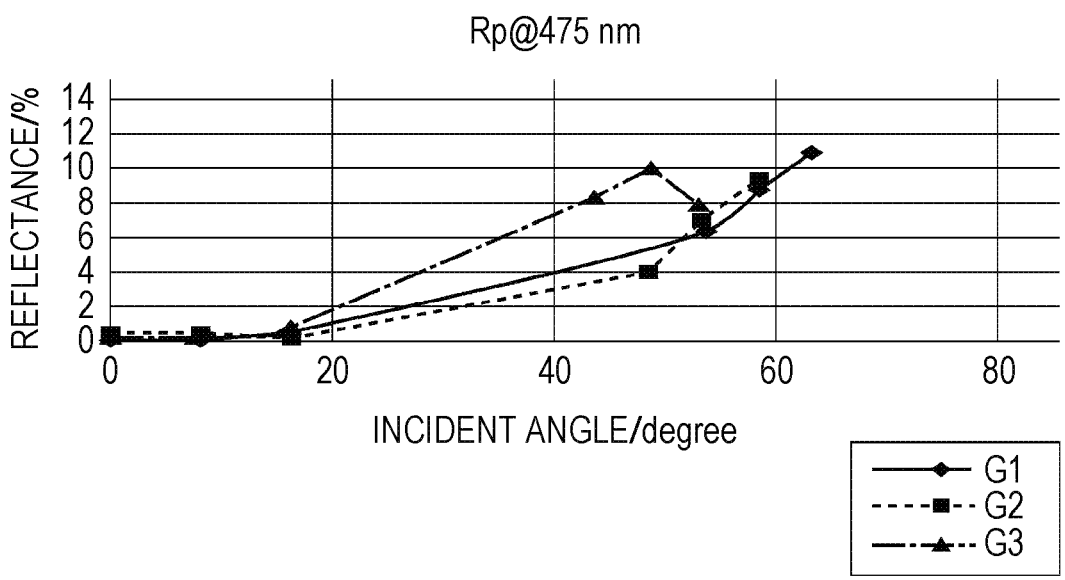
Figure 13:
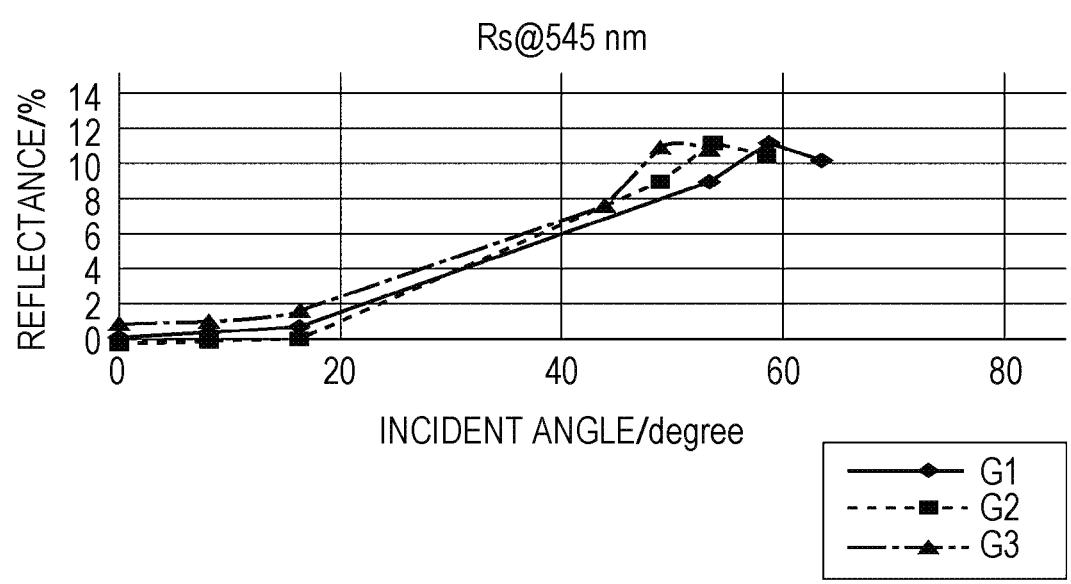
FIG. 13 is a graph illustrating the incident angle dependence on the reflectance of each of the partial reflection surfaces illustrated in FIGS. 9, 10 and 11 for light beams having a wavelength of 545 nm.
Figure 13:
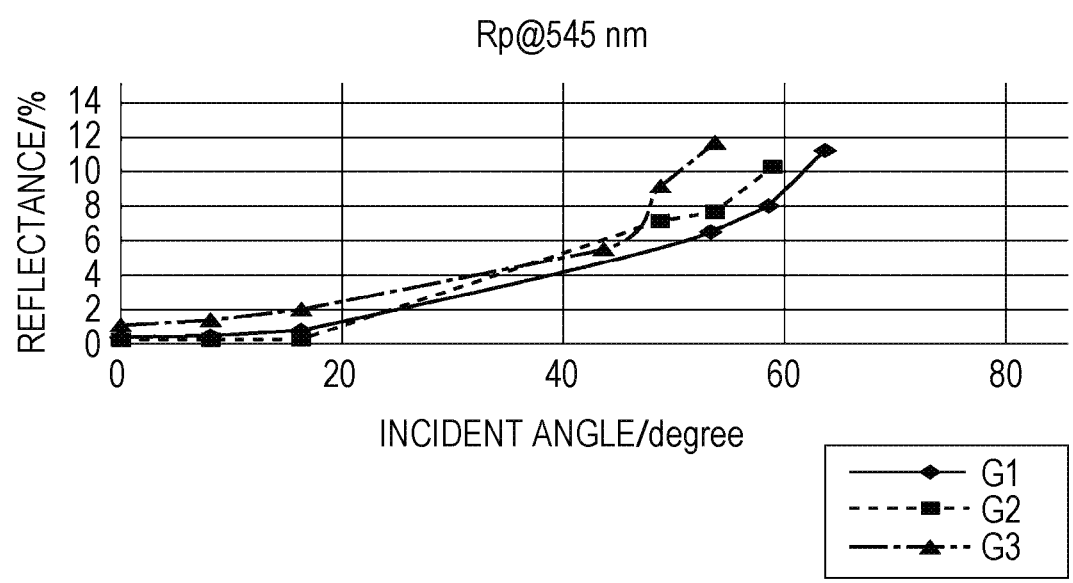
Figure 14:
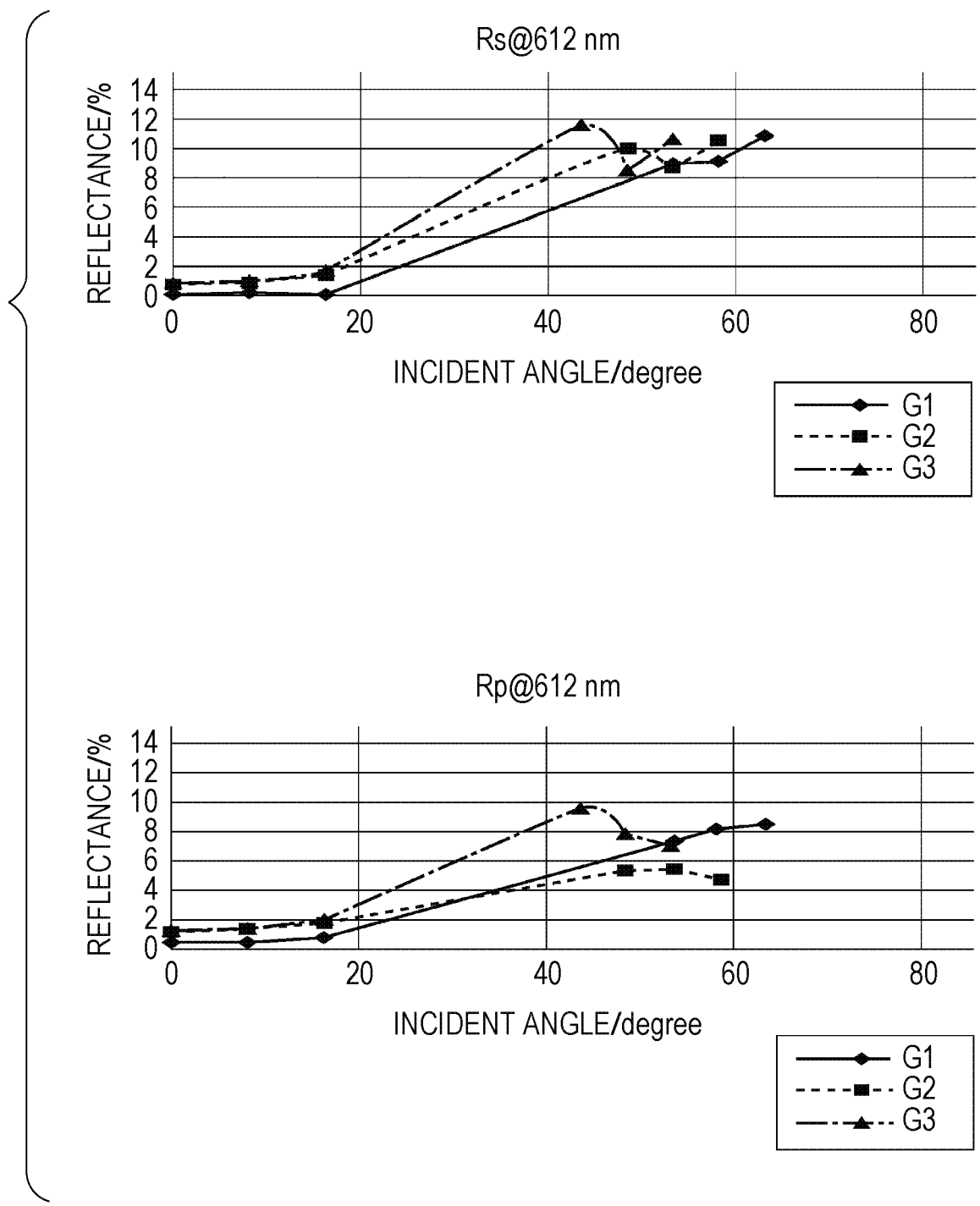
FIG. 14 is a graph illustrating the incident angle dependence on the reflectance of each of the partial reflection surfaces illustrated in FIGS. 9, 10 and 11 for light beams having a wavelength of 612 nm.

FIG. 8 is a graph illustrating an ideal incident angle dependence on the reflectance of the partial reflection surface 55 for each group illustrated in FIG. 7, and illustrates a case where the incident angle range on the reflectance is constant for each of red light beams (R), green light beams, and blue light beams. FIG. 9 is an explanatory diagram illustrating a configuration example of the partial reflection surface 55 of the first group G1 illustrated in FIG. 7, FIG. 10 is an explanatory diagram illustrating a configuration example of the partial reflection surface 55 of the second group G2 illustrated in FIG. 7, and FIG. 11 is an explanatory diagram illustrating a configuration example of the partial reflection surface 55 of the third group G3 illustrated in FIG. 7. FIG. 12 is a graph illustrating the incident angle dependence on the reflectance of each of the partial reflection surfaces 55 illustrated in FIGS. 9, 10 and 11 for light beams having a wavelength of 475 nm, FIG. 13 is a graph illustrating the incident angle dependence on the reflectance of each of the partial reflection surfaces 55 illustrated in FIGS. 9, 10 and 11 for light beams having a wavelength of 545 nm, and FIG. 14 is a graph illustrating the incident angle dependence on the reflectance of each of the partial reflection surfaces 55 illustrated in FIGS. 9, 10 and 11 for light beams having a wavelength of 612 nm. In FIGS. 8, 12, 13, and 14, the incident angle dependence on the reflectance of each of the partial reflection surfaces 55 of the first group G1 is illustrated by a solid line, the incident angle dependence on the reflectance of each of the partial reflection surfaces 55 of the second group G2 is illustrated by a dotted line, and the incident angle dependence on the reflectance of each of the partial reflection surfaces 55 of the third group G3 is illustrated by a one-dot chain line. In addition, in upper portions of FIGS. 8, 12, 13 and 14, the incident angle dependence on the reflectance for S-polarized light beams is illustrated, and in lower portions of FIGS. 8, 12, 13 and 14, the incident angle dependence on the reflectance for P-polarized light beams is illustrated.

When performing the grouping described with reference to FIG. 7, in the incident angle dependence on the reflectance of each of the partial reflection surfaces 55 of the first group G1, the second group G2, and the third group G3, the characteristic illustrated in FIG. 8 is ideal. FIGS. 12, 13 and 14 illustrate the incident angle dependence on the reflectance of the partial reflection surfaces 55 when the partial reflection surfaces 55 are formed by a multilayer film illustrated in FIGS. 9, 10 and 11.

In such a configuration, when the light guide portion 50 is manufactured by stacking a plurality of transparent substrates with the partial reflection surfaces 55 interposed therebetween using an adhesive and cutting the transparent substrates, the multilayer film illustrated in FIGS. 9, 10, and 11 is formed. Therefore, in FIGS. 9, 10 and 11, a base material corresponds to the transparent substrate used for forming the light guide portion 50, and a bonding layer corresponds to an adhesive layer when bonding the transparent substrates to each other with the partial reflection surfaces 55 interposed therebetween. In the present embodiment, the adhesive layer has substantially the same refractive index as that of the transparent substrate. In addition, in FIGS. 9, 10, and 11, M is a mixed metal oxide layer including aluminum. Further, a reflective metal layer including aluminum, silver, magnesium, chromium, or the like as a main component may be provided between the dielectric multilayer films.

As illustrated in FIGS. 12, 13, and 14, in a case where the partial reflection surfaces 55 are formed by the multilayer film illustrated in FIGS. 9, 10, and 11, as illustrated in FIG. 8, the appropriate incident angle range in which the reflectance is constant can be obtained. On the other hand, it is confirmed that an appropriate incident angle range in which the incident angle dependence on the reflectance at a visible light wavelength region is lower than that in any other incident angle range appears. In addition, when comparing the S-polarized light beams and the P-polarized light beams, the appropriate incident angle range in which the reflectance is constant clearly appears in the S-polarized light beams, and thus the S-polarized light beams are preferably used.

Second Embodiment

Figure 15:
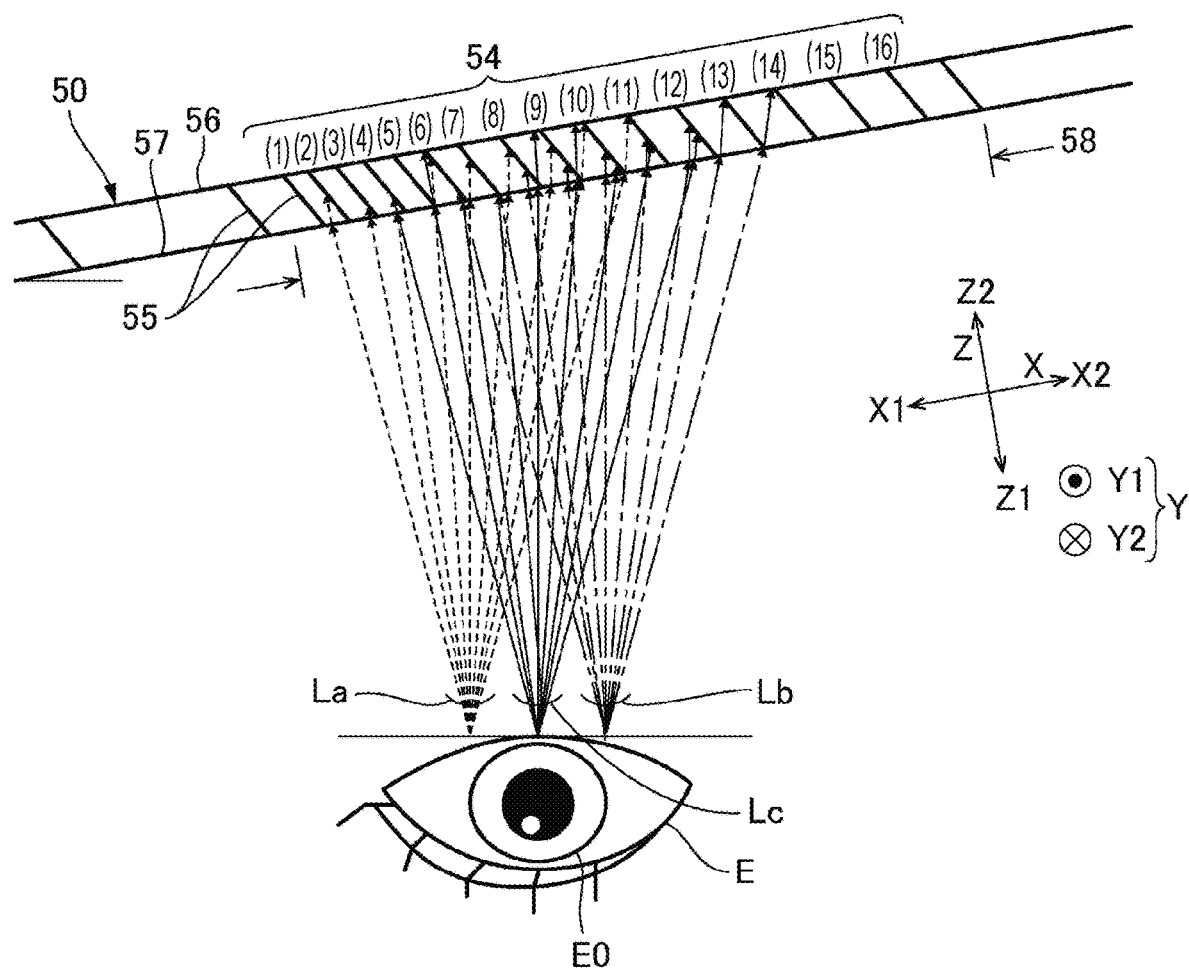
FIG. 15 is an explanatory diagram of the partial reflection surfaces of a light guide device according to a second embodiment.
Figure 16:
FIG. 16 is an explanatory diagram illustrating from which directions light beams reflected by the plurality of partial reflection surfaces illustrated in FIG. 15 are incident on an eye.
Figure 17:
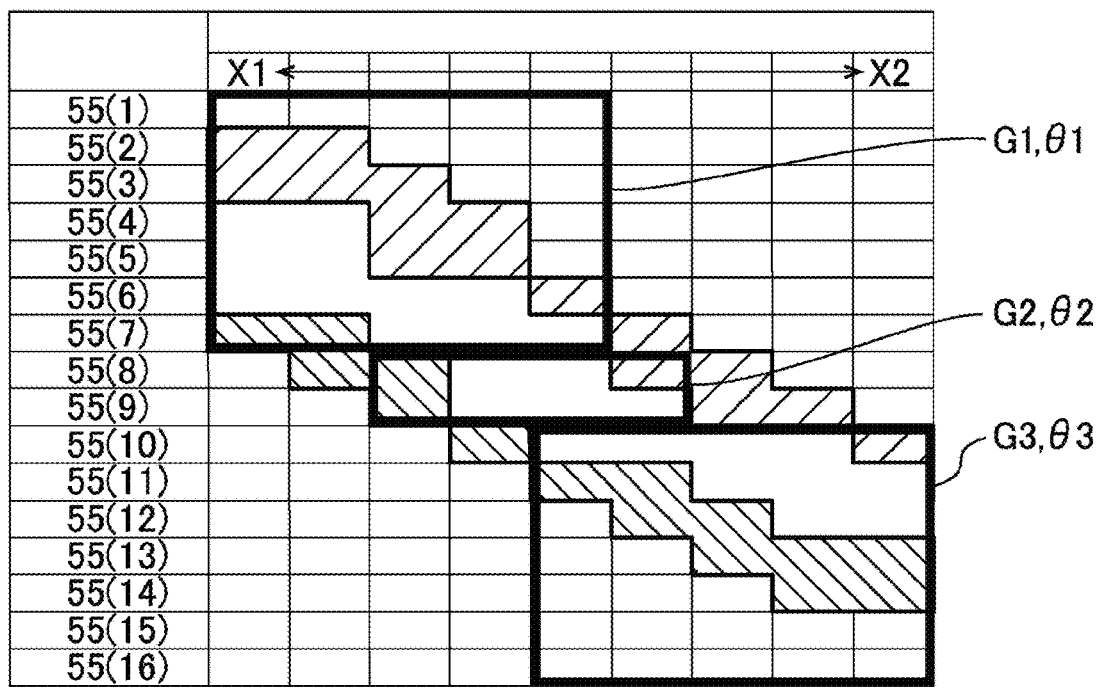
FIG. 17 is an explanatory diagram illustrating a manner in which the appropriate incident angle ranges are set by grouping the partial reflection surfaces illustrated in FIG. 15 into three groups.
Figure 18:
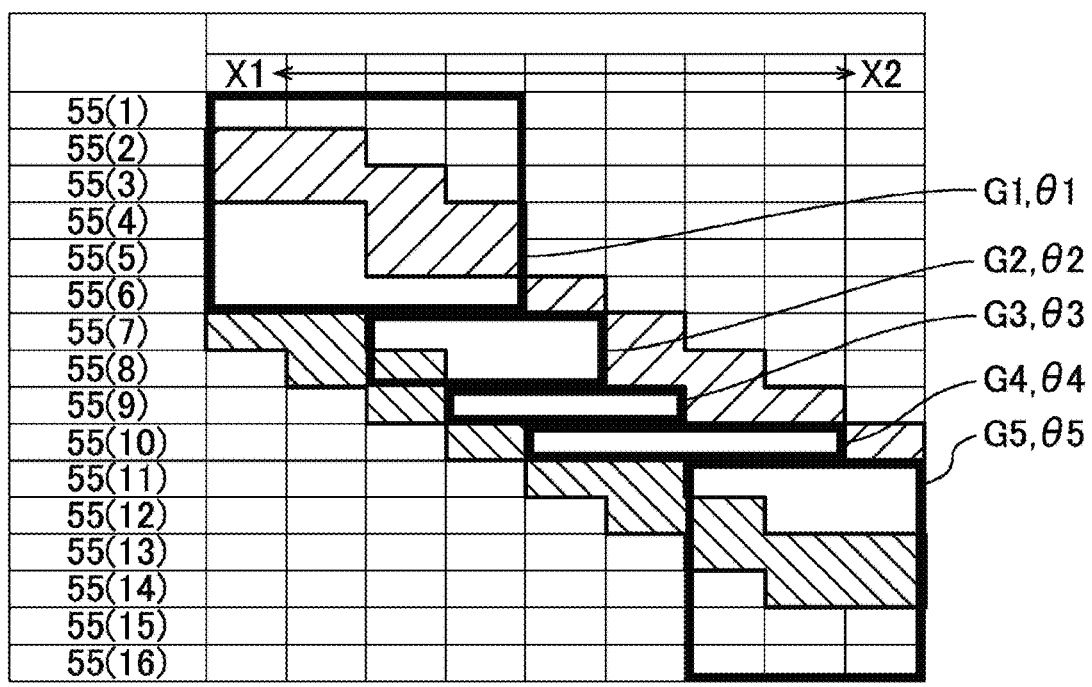
FIG. 18 is an explanatory diagram illustrating a manner in which the appropriate incident angle ranges are set by grouping the partial reflection surfaces illustrated in FIG. 15 into five groups.

FIG. 15 is an explanatory diagram of the partial reflection surfaces 55 of the light guide system 30 according to a second embodiment, and illustrates a state when a light path of each light beam incident on the eye E is viewed from the eye E side. FIG. 16 is an explanatory diagram illustrating from which directions the light beams reflected by the plurality of partial reflection surfaces 55 illustrated in FIG. 15 are incident on the eye E. In an upper portion of FIG. 16, in a case where the eye E is positioned at the center, the left side, and the right side, a state where the light beams reflected by each of the partial reflection surfaces 55(1) to 55(16) are incident on the eye E from each angle direction in the first direction X, is illustrated. In a lower portion of FIG. 16, the results illustrated in the upper portion of FIG. 16 are superimposed. FIG. 17 is an explanatory diagram illustrating a state where the appropriate incident angle ranges are set by grouping the partial reflection surfaces 55 illustrated in FIG. 15 into three groups. FIG. 18 is an explanatory diagram illustrating a manner in which the appropriate incident angle ranges are set by grouping the partial reflection surfaces 55 illustrated in FIG. 15 into five groups. Since the basic configuration of the present embodiment and embodiments to be described is the same as that of the first embodiment, the same reference numerals are given to the common portions, and a description thereof will be omitted.

In the light guide system 30 illustrated in FIG. 15, the plurality of partial reflection surfaces 55 are disposed in the light guide portion 50 at an angle of 60° with respect to the first surface 56. In addition, the plurality of partial reflection surfaces 55 are disposed such that intervals between the partial reflection surfaces are widened from the one end 51 toward the other end 52. Therefore, when viewed from the eye E, between the two adjacent partial reflection surfaces 55 on the one end 51 side and the other end 52 side, a wide overlapped portion or a wide gap between the partial reflection surfaces 55 is not present. In addition, since the light guide portion 50 is disposed obliquely such that the other end 52 side is separated from a face, when viewed from the eye E, the partial reflection surface 55 are directed toward a large area. Here, in the light guide portion 50, the interval between the partial reflection surfaces 55 in the second direction Z is ½ that in the first embodiment, and thus a larger number of the partial reflection surfaces 55 are disposed at short intervals.

As illustrated in FIGS. 15 and 16, in the present embodiment, in a case where the eye E is positioned at the center in the first direction X, as illustrated by the solid lines Lc, the light beams reflected by the fourth to twelfth partial reflection surfaces 55 are refracted by the second surface 57, and are incident on the eye E from each angle direction. In addition, in a case where the eye E is moved toward one side X1 of the first direction X, as illustrated by the broken lines La, the light beams reflected by the second to eleventh partial reflection surfaces 55 are refracted by the second surface 57, and then are incident on the eye E from each angle direction. On the other hand, in a case where the eye E is moved toward the other side X2 of the first direction X, as illustrated by the one-dot chain lines Lb, the light beams reflected by the sixth to fourteenth partial reflection surfaces 55 are refracted by the second surface 57, and then are incident on the eye E from each angle direction.

In any case described above, the incident angle of the light beam, which is reflected by the partial reflection surface 55 positioned on the one end 51 side and is directed toward the eye E, with respect to the partial reflection surface 55 is larger than the incident angle of the light beam, which is reflected by the partial reflection surface 55 positioned on the other end 52 side and is directed toward the eye E, with respect to the partial reflection surface 55. In the present embodiment, as described below with reference to FIGS. 16 and 17, in the plurality of partial reflection surfaces 55, an appropriate incident angle range of the partial reflection surface 55 positioned on the one end 51 side is set to a larger angle than that of the partial reflection surface 55 positioned on the other end 52 side, and in the appropriate incident angle range, the incident angle dependence on the reflectance at a visible light wavelength region is lower than that in any other incident angle range. In addition, the reflectance in the appropriate incident angle range is higher than that in any other incident angle range.

In the configuration illustrated in FIG. 17, the partial reflection surfaces 55 are divided into three groups, and the appropriate incident angle range is set for each group of the partial reflection surfaces 55. More specifically, as illustrated in FIG. 17, in correspondence with the incident angles of the light beams incident on the eye E with respect to the partial reflection surfaces 55, the first to seventh partial reflection surfaces 55(1) to 55(7) positioned on the one end 51 side are set in a first group G1 with an appropriate incident angle range θ1, the eighth and ninth partial reflection surfaces 55(8) and 55(9) are set in a second group G2 with an appropriate incident angle range θ2, and the tenth to sixteenth partial reflection surfaces 55(10) to 55(16) are set in a third group G3 with an appropriate incident angle range θ3. Here, the appropriate incident angle ranges θ1, θ2, and θ3 have the following relationship.

$$\theta1 > \theta2 > \theta3$$

In the present embodiment, the appropriate incident angle ranges θ1, θ2, and θ3 are ranges satisfying the above condition. For example, θ1 is set within a range from 53.3° to 63.3°, θ2 is set within a range from 48.5° to 58.4°, and θ3 is set within a range from 43.7° to 53.3°.

In addition, as in the configuration illustrated in FIG. 18, the partial reflection surfaces 55 are divided into five groups, and the appropriate incident angle range may be set for each group of the partial reflection surfaces 55. More specifically, as illustrated in FIG. 18, in correspondence with the incident angles of the light beams incident on the eye E with respect to the partial reflection surfaces 55, the first to sixth partial reflection surfaces 55(1) to 55(6) positioned on the one end 51 side are set in a first group G1 with an appropriate incident angle range θ1, and the seventh and eighth partial reflection surfaces 55(7) and 55(8) are set in a second group G2 with an appropriate incident angle range θ2. Further, the ninth partial reflection surface 55(9) is set in a third group G3 with an appropriate incident angle range θ3, and the tenth partial reflection surface 55(10) is set in a fourth group G4 with an appropriate incident angle range θ4. Furthermore, the eleventh to sixteenth partial reflection surfaces 55(11) to 55(16) are set in a fifth group G5 with an appropriate incident angle range θ5. Here, the appropriate incident angle ranges θ1, θ2, θ3, θ4, and θ5 have the following relationship.

$$\theta1 > \theta2 > \theta3 > \theta4 > \theta5$$

Even in this configuration, similar to the first embodiment, the incident angle of the light beam, which is reflected by the partial reflection surface 55 positioned on the one end 51 side and is directed toward the eye E, with respect to the partial reflection surface 55 is larger than the incident angle of the light beam, which is reflected by the partial reflection surface 55 positioned on the other end 52 side and is directed toward the eye E, with respect to the partial reflection surface 55. On the other hand, in the present embodiment, the appropriate incident angle range of the partial reflection surface 55 positioned on the one end 51 side is set to a larger angle than the appropriate incident angle range of the partial reflection surface 55 positioned on the other end 52 side. Therefore, it is possible to increase intensity of each light beam which is reflected by each of the plurality of partial reflection surfaces 55 and is incident on the eye E of the observer, and thus the observer can recognize the image with high brightness. In addition, in a case where the eye E is positioned at the center of the movable range in the first direction X (right and left direction) (corresponding to a blank portion in FIG. 17), the groups are set such that the incident angles of the light beams directed toward the eye E of the observer are within the appropriate incident angle range. Therefore, in a case where the eye E is positioned at the center of the movable range in the first direction X (right and left direction), it is possible to increase the intensity of each light beam which is reflected by each of the partial reflection surfaces 55 and is incident on the eye E of the observer. Thus, it is possible to obtain the same effect as that of the first embodiment, such as the effect in that the observer can recognize the image with high brightness.

Third Embodiment

Figure 19:
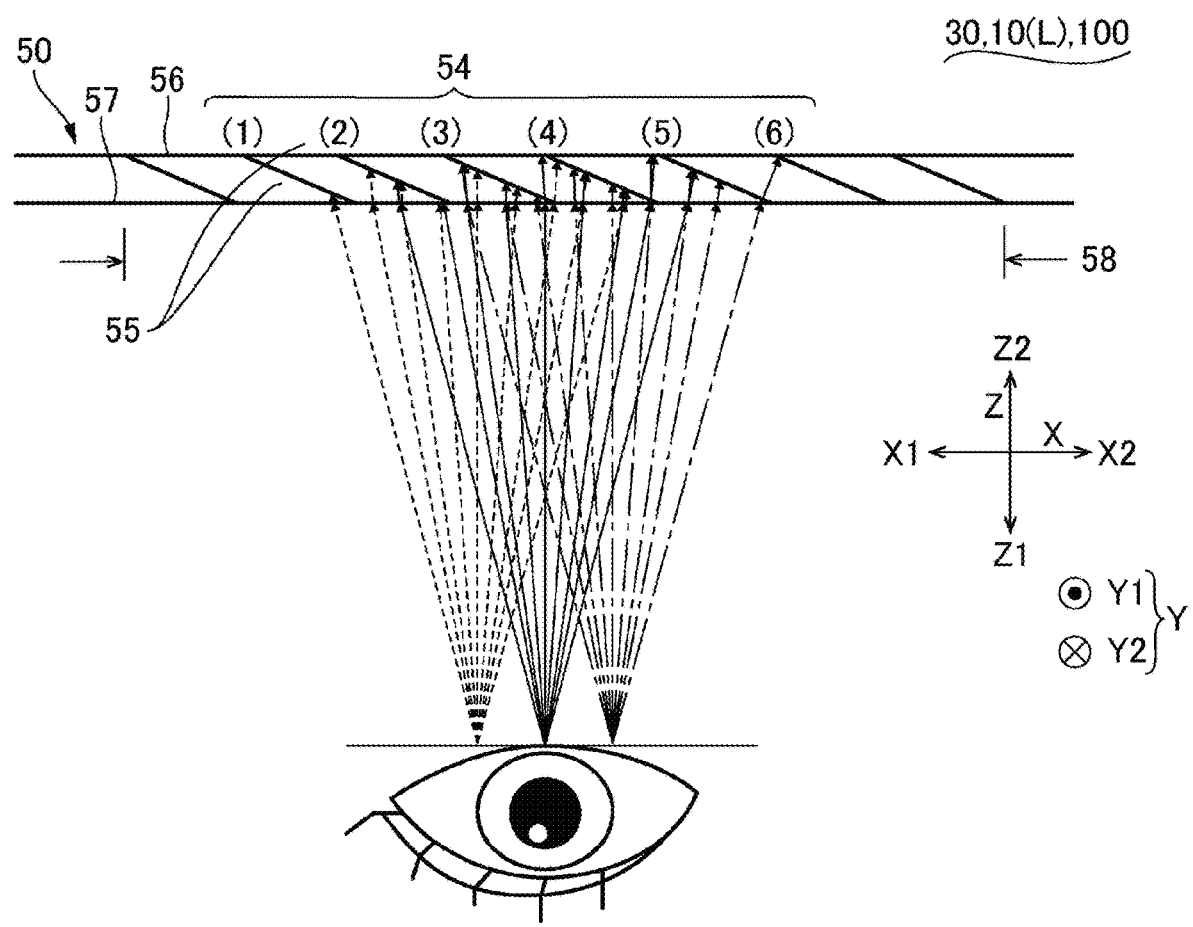
FIG. 19 is an explanatory diagram of the partial reflection surfaces of the light guide device according to a third embodiment.
Figure 20:
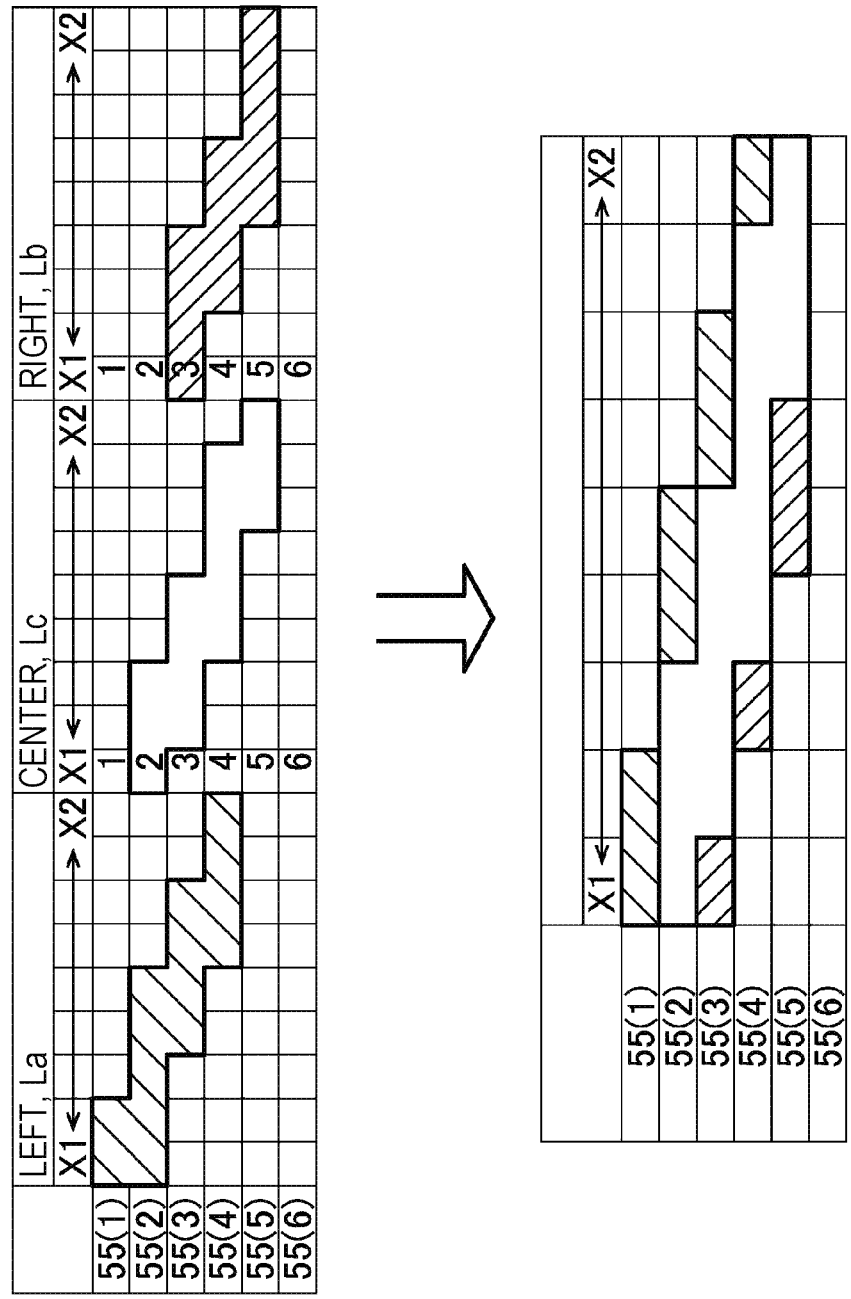
FIG. 20 is an explanatory diagram illustrating from which directions the light beams reflected by the plurality of partial reflection surfaces illustrated in FIG. 19 are incident on an eye.
Figure 21:
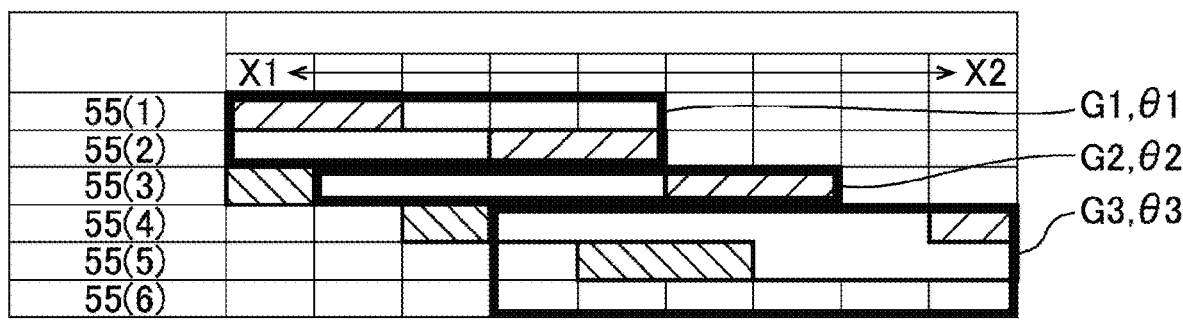
FIG. 21 is an explanatory diagram illustrating a manner in which the appropriate incident angle ranges are set by grouping the partial reflection surfaces illustrated in FIG. 19 into three groups.
Figure 22:
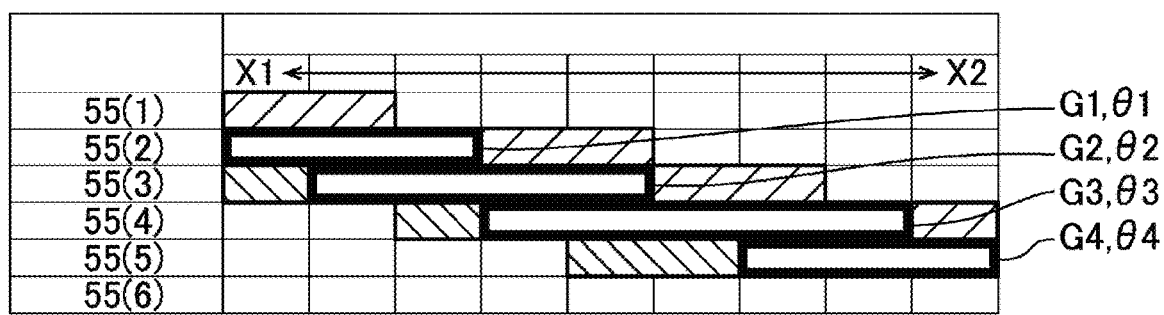
FIG. 22 is an explanatory diagram illustrating a manner in which the appropriate incident angle ranges are set by grouping the partial reflection surfaces illustrated in FIG. 19 into four groups.

FIG. 19 is an explanatory diagram of the partial reflection surfaces 55 of the light guide system 30 according to a third embodiment, and illustrates a state when a light path of each light beam incident on the eye E is viewed from the eye E side. FIG. 20 is an explanatory diagram illustrating which angle directions the light beams reflected by the partial reflection surfaces 55 illustrated in FIG. 19 are incident on the eye E. In an upper portion of FIG. 20, in a case where the eye E is positioned at the center, the left side, and the right side, a state where the light beams reflected by each of the partial reflection surfaces 55(1) to 55(6) are incident on the eye E from each angle direction in the first direction X, is illustrated. In a lower portion of FIG. 20, the results illustrated in the upper portion of FIG. 20 are superimposed. FIG. 21 is an explanatory diagram illustrating a manner in which the appropriate incident angle ranges are set by grouping the partial reflection surfaces 55 illustrated in FIG. 19 into three groups. FIG. 22 is an explanatory diagram illustrating a manner in which the appropriate incident angle ranges are set by grouping the partial reflection surfaces 55 illustrated in FIG. 19 into four groups.

In the light guide system 30 illustrated in FIG. 19, the plurality of partial reflection surfaces 55 are disposed in the light guide portion 50 at an angle of 23° with respect to the first surface 56. Thus, when viewed from the eye E, since the partial reflection surface 55 are directed toward a large area, the light guide portion 50 is disposed in parallel to the face.

As illustrated in FIGS. 19 and 20, in the present embodiment, in a case where the eye E is positioned at the center in the first direction X, as illustrated by the solid lines Lc, the light beams reflected by the first to fourth partial reflection surfaces 55 are refracted by the second surface 57, and are incident on the eye E from each angle direction. In addition, in a case where the eye E is moved toward one side X1 of the first direction X, as illustrated by the broken lines La, the light beams reflected by the second to fifth partial reflection surfaces 55 are refracted by the second surface 57, and then are incident on the eye E from each angle direction. On the other hand, in a case where the eye E is moved toward the other side X2 of the first direction X, as illustrated by the one-dot chain lines Lb, the light beams reflected by the third to fifth partial reflection surfaces 55 are refracted by the second surface 57, and then are incident on the eye E from each angle direction.

In any case described above, the incident angle of the light beam, which is reflected by the partial reflection surface 55 positioned on the one end 51 side and is directed toward the eye E, with respect to the partial reflection surface 55 is larger than the incident angle of the light beam, which is reflected by the partial reflection surface 55 positioned on the other end 52 side and is directed toward the eye E, with respect to the partial reflection surface 55. In the present embodiment, as described below with reference to FIGS. 21 and 22, in the plurality of partial reflection surfaces 55, an appropriate incident angle range of the partial reflection surface 55 positioned on the one end 51 side is set to a larger angle than that of the partial reflection surface 55 positioned on the other end 52 side, and in the appropriate incident angle range, the incident angle dependence on the reflectance at a visible light wavelength region is lower than that in any other incident angle range. In addition, the reflectance in the appropriate incident angle range is higher than that in any other incident angle range.

In the configuration illustrated in FIG. 21, the partial reflection surfaces 55 are divided into three groups, and the appropriate incident angle range is set for each group of the partial reflection surfaces 55. More specifically, as illustrated in FIG. 21, in correspondence with the incident angles of the light beams incident on the eye E with respect to the partial reflection surfaces 55, the first and second partial reflection surfaces 55(1) and 55(2) positioned on the one end 51 side are set in a first group G1 with an appropriate incident angle range θ1, the third partial reflection surface 55(3) is set in a second group G2 with an appropriate incident angle range θ2, and the fourth and sixth partial reflection surfaces 55(4) to 55(6) are set in a third group G3 with an appropriate incident angle range θ3. Here, the appropriate incident angle ranges θ1, θ2, and θ3 have the following relationship.

θ1>θ2>θ3

In the present embodiment, the appropriate incident angle ranges θ1, θ2, and θ3 are ranges satisfying the above condition. For example, θ1 is set within a range from 23.0° to 31.6°, θ2 is set within a range from 18.7° to 29.5°, and θ3 is set within a range from 14.4° to 27.3°.

In addition, as in the configuration illustrated in FIG. 22, the partial reflection surfaces 55 are divided into four groups, and the appropriate incident angle range may be set for each group of the partial reflection surfaces 55. More specifically, as illustrated in FIG. 22, in correspondence with the incident angles of the light beams incident on the eye E with respect to the partial reflection surfaces 55, the second partial reflection surface 55(2) positioned on the one end 51 side is set in a first group G1 with an appropriate incident angle range θ1, and the third partial reflection surface 55(3) is set in a second group G2 with an appropriate incident angle range θ2. Further, the fourth partial reflection surface 55(4) is set in a third group G3 with an appropriate incident angle range θ3, and the fifth partial reflection surface 55(5) is set in a fourth group G4 with an appropriate incident angle range θ4. Here, the appropriate incident angle ranges θ1, θ2, θ3, and θ4 have the following relationship.

The sixth partial reflection surface 55(6) may be included in the fourth group G4, or may be included in a fifth group (not illustrated).

θ1>θ2>θ3>θ4

Even in this configuration, similar to the first embodiment, the incident angle of the light beam, which is reflected by the partial reflection surface 55 positioned on the one end 51 side and is directed toward the eye E, with respect to the partial reflection surface 55 is larger than the incident angle of the light beam, which is reflected by the partial reflection surface 55 positioned on the other end 52 side and is directed toward the eye E, with respect to the partial reflection surface 55. On the other hand, in the present embodiment, the appropriate incident angle range of the partial reflection surface 55 positioned on the one end 51 side is set to a larger angle than the appropriate incident angle range of the partial reflection surface 55 positioned on the other end 52 side. Therefore, it is possible to increase intensity of each light beam which is reflected by each of the plurality of partial reflection surfaces 55 and is incident on the eye E of the observer, and thus the observer can recognize the image with high brightness. In addition, in a case where the eye E is positioned at the center of the movable range in the first direction X (right and left direction) (corresponding to a blank portion in FIG. 17), the groups are set such that the incident angles of the light beams directed toward the eye E of the observer are within the appropriate incident angle range. Therefore, in a case where the eye E is positioned at the center of the movable range in the first direction X (right and left direction), it is possible to increase the intensity of each light beam which is reflected by each of the partial reflection surfaces 55 and is incident on the eye E of the observer. Thus, it is possible to obtain the same effect as that of the first embodiment, such as the effect in that the observer can recognize the image with high brightness.

Fourth Embodiment

Figure 23:
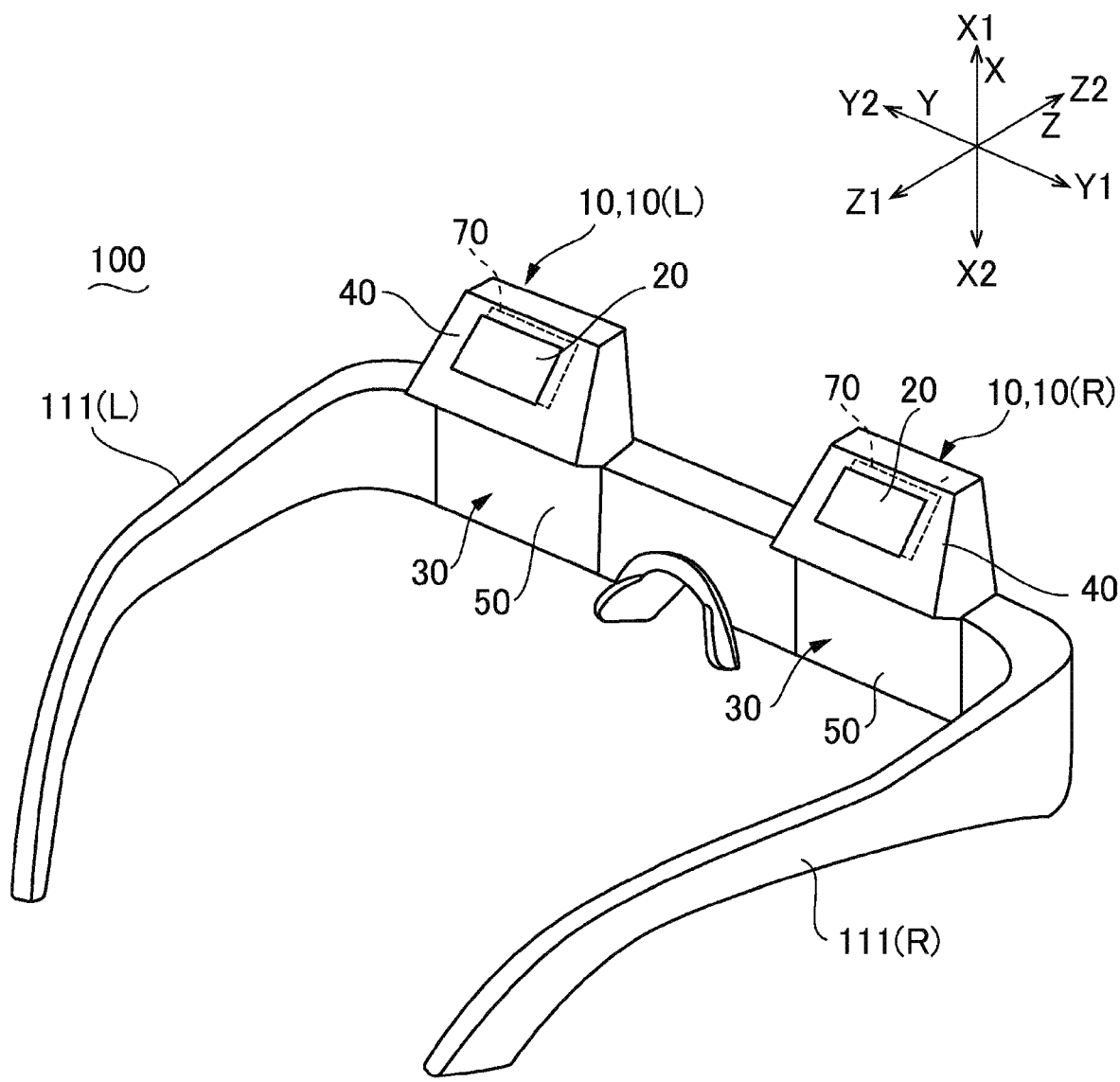
FIG. 23 is an explanatory view schematically illustrating an example of an appearance of the display apparatus according to a fourth embodiment.
Figure 24:
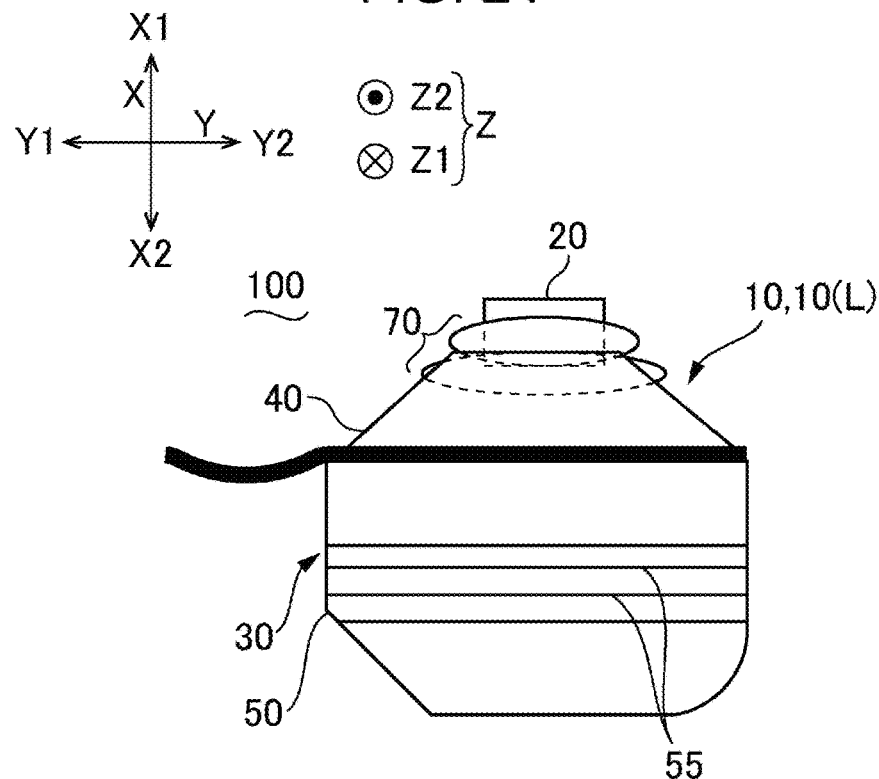
FIG. 24 is a front view of the display apparatus illustrated in FIG. 23 when viewed from a front direction of an observer.
Figure 25:
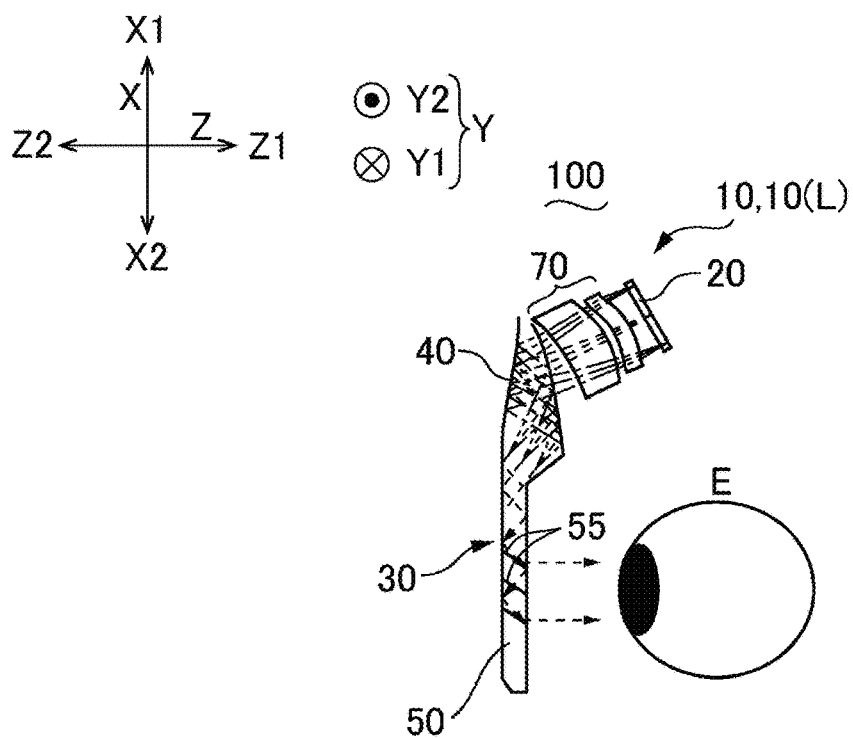
FIG. 25 is a side view of the display apparatus illustrated in FIG. 23 when viewed from a left side.

FIG. 23 is an explanatory view schematically illustrating an example of an appearance of a display apparatus 100 according to a fourth embodiment. FIG. 24 is a front view of the display apparatus 100 illustrated in FIG. 23 when viewed from a front direction of the observer. FIG. 25 is a side view of the display apparatus 100 illustrated in FIG. 23 when viewed from a left side. In the display apparatus 100 according to the first embodiment, the image generation system 20 and the light-incident portion 40 are disposed on an ear side, and the image light beams L are guided from the ear side toward a nose side. On the other hand, in the present embodiment, as illustrated in FIGS. 23, 24, and 25, the image generation system 20 and the light-incident portion 40 are disposed in front of the eye and above the eye, and the light guide portion 50 extends from an upper side toward a lower side. Thus, the image light beams L are guided from the upper side toward the lower side, and are emitted toward the eye. Therefore, in the present embodiment, an upper-lower direction corresponds to the first direction X, a front-rear direction corresponds to the second direction Z, and a right-left direction corresponds to the third direction Y. In addition, one side X1 of the first direction X corresponds to the upper side, and the other side X2 of the first direction X corresponds to the lower side.

Other Embodiments

In the embodiments described above, an anti-reflection film may be provided on the first surface 56 or the second surface 57. Even in a case where light beams from the outside (see-through light beams) are transmitted or a case where the image light beams L are emitted from the light guide portion 50 to the outside, when reflection occurs at an interface between the light guide portion 50 and the light-incident portion 40, a loss in the light beams occurs due to the reflection. Therefore, by providing the anti-reflection film, it is possible to increase the brightness for both of the see-through light beams and the image light beams L. In addition, an amount of unnecessary return light beams can be decreased, and thus occurrence of ghost can be suppressed.

The entire disclosure of Japanese Patent Application No. 2017-062400, filed Mar. 28, 2017 is expressly incorporated by reference herein.

What is claimed is:
1. A light guide device comprising:
a transparent light guide portion that guides light beams from one end side to another end side in a first direction,
wherein the light guide portion includes
a first surface that extends from the one end side toward the another end side,
a second surface that extends in the first direction and in parallel to the first surface in one side of a second direction intersecting with the first direction,
a plurality of partial reflection surfaces that are disposed along the first direction between the first surface and the second surface and are inclined at the same angle from a normal direction with respect to the second surface toward the one end side, and
a light-emitting portion that is a portion of the second surface which overlaps with the plurality of partial reflection surfaces in one side of the second direction, the portion of the second surface being a portion on which the plurality of partial reflection surfaces are formed, and wherein, in the plurality of partial reflection surfaces, an appropriate incident angle range of the partial reflection surface positioned on the one end side is set to a larger angle than that of the partial reflection surface positioned on the another end side such that, in the appropriate incident angle range, an incident angle dependence on a reflectance at a visible light wavelength region is lower than that in any other incident angle range.

2. The light guide device according to claim 1,
wherein the appropriate incident angle range of the plurality of partial reflection surfaces is set for each of a plurality of groups obtained by grouping the plurality of partial reflection surfaces into groups of a number less than the number of the plurality of partial reflection surfaces.

3. The light guide device according to claim 2,
wherein the plurality of partial reflection surfaces are grouped into groups of any number from three to five.

4. A display apparatus comprising:
the light guide device according to claim 3; and
an image generation system that generates image light beams,
wherein the light guide device includes a transparent light-incident portion to which the one end side of the light guide portion is connected,
wherein the light-incident portion includes a light-incident curved surface on which the image light beams as non-parallel light beams are incident and a light-reflective curved surface which reflects the image light beams incident from the light-incident curved surface, and
wherein the image light beams are converted into parallel light beams by the light-incident curved surface and the light-reflective curved surface and are emitted to the light guide portion.

5. The light guide device according to claim 2,
wherein, in a state where the light-emitting portion is disposed in front of an eye of an observer, when the eye of the observer is positioned at the center of a movable range, incident angles of the light beams toward the eye are within the appropriate incident angle range of the plurality of partial reflection surfaces.

6. A display apparatus comprising:
the light guide device according to claim 5; and
an image generation system that generates image light beams,
wherein the light guide device includes a transparent light-incident portion to which the one end side of the light guide portion is connected,
wherein the light-incident portion includes a light-incident curved surface on which the image light beams as non-parallel light beams are incident and a light-reflective curved surface which reflects the image light beams incident from the light-incident curved surface, and
wherein the image light beams are converted into parallel light beams by the light-incident curved surface and the light-reflective curved surface and are emitted to the light guide portion.

7. A display apparatus comprising:
the light guide device according to claim 2; and
an image generation system that generates image light beams,
wherein the light guide device includes a transparent light-incident portion to which the one end side of the light guide portion is connected,
wherein the light-incident portion includes a light-incident curved surface on which the image light beams as non-parallel light beams are incident and a light-reflective curved surface which reflects the image light beams incident from the light-incident curved surface, and
wherein the image light beams are converted into parallel light beams by the light-incident curved surface and the light-reflective curved surface and are emitted to the light guide portion.

8. The light guide device according to claim 1,
wherein at least one partial reflection surface among the plurality of partial reflection surfaces includes a multilayer film including a reflective metal layer.

9. A display apparatus comprising:
the light guide device according to claim 8; and
an image generation system that generates image light beams,
wherein the light guide device includes a transparent light-incident portion to which the one end side of the light guide portion is connected,
wherein the light-incident portion includes a light-incident curved surface on which the image light beams as non-parallel light beams are incident and a light-reflective curved surface which reflects the image light beams incident from the light-incident curved surface, and
wherein the image light beams are converted into parallel light beams by the light-incident curved surface and the light-reflective curved surface and are emitted to the light guide portion.

10. A display apparatus comprising:
the light guide device according to claim 1; and
an image generation system that generates image light beams,
wherein the light guide device includes a transparent light-incident portion to which the one end side of the light guide portion is connected,
wherein the light-incident portion includes a light-incident curved surface on which the image light beams as non-parallel light beams are incident and a light-reflective curved surface which reflects the image light beams incident from the light-incident curved surface, and
wherein the image light beams are converted into parallel light beams by the light-incident curved surface and the light-reflective curved surface and are emitted to the light guide portion.

11. The display apparatus according to claim 10,
wherein the light-incident portion is formed of a first transparent member,
wherein the first transparent member is surface-bonded to a second transparent member via a bonding surface in the first direction, and
wherein at least the plurality of partial reflection surfaces of the light guide portion are formed of the second transparent member.

* * * * *